US012736669B2

(12) United States Patent
Chambers et al.

(10) Patent No.: US 12,736,669 B2
(45) Date of Patent: Sep. 15, 2026

(54) SUBMERSIBLE DEVICE FOR UNDERWATER SONAR IMAGERY

(71) Applicant: Navico Group Americas, LLC, Menomonee Falls, WI (US)

(72) Inventors: Andrew Chambers, Broken Arrow, OK (US); Dustyn P. Pendergraft, Claremore, OK (US)

(73) Assignee: Navico Group Americas, LLC, Menomonee Falls, WI (US)

( * ) Notice: Subject to any disclaimer, the term of this patent is extended or adjusted under 35 U.S.C. 154(b) by 350 days.

(21) Appl. No.: 18/423,624

(22) Filed: Jan. 26, 2024

(65) Prior Publication Data

US 2025/0244476 A1 Jul. 31, 2025

(51) Int. Cl.

| | |
|---|---|
| ***G01S 15/89*** | (2006.01) |
| ***B63B 21/66*** | (2006.01) |
| ***B63B 22/00*** | (2006.01) |
| ***B63G 8/00*** | (2006.01) |
| ***B63G 8/08*** | (2006.01) |
| ***B63G 8/24*** | (2006.01) |
| ***B63G 8/38*** | (2006.01) |

(Continued)

(52) U.S. Cl.
CPC .............. *G01S 15/89* (2013.01); *B63B 21/66* (2013.01); *B63B 22/00* (2013.01); *B63G 8/001* (2013.01); *B63G 8/08* (2013.01); *B63G 8/24* (2013.01); *B63G 8/38* (2013.01); *B63G 8/42* (2013.01); *B63H 25/04* (2013.01); *B63G 2008/005* (2013.01); *G06V 10/751* (2022.01); *G06V 20/05* (2022.01)

(58) Field of Classification Search
CPC ......... G01S 15/00; G01S 15/89; B63B 21/00; B63B 21/66; B63G 8/00; B63G 8/001; B63G 8/08; B63G 8/24; B63G 8/38; B63G 8/42; B63H 25/00; B63H 25/04
USPC .......................................................... 114/242
See application file for complete search history.

(56) References Cited

U.S. PATENT DOCUMENTS 6,612,886 B2 * 9/2003 Cole, Jr. ................ B63B 22/12 114/245
10,351,220 B1 7/2019 Witte et al.
(Continued)

OTHER PUBLICATIONS

Edgetech 4125-SAR Search & Recovery Side Scan; Dive Rescue International; retrieved Jan. 23, 2024 from https://www.diverescueintl.com/product/edgetech-4125-sar-search-recovery-side-scan/.
(Continued)

*Primary Examiner* — Lars A Olson
(74) *Attorney, Agent, or Firm* — Nelson Mullins Riley & Scarborough LLP

(57) ABSTRACT

An example towable device for a watercraft is provided. The device includes an adaptive mount configured to receive a transducer assembly and a connection feature for attachment of a linking mechanism for attachment of the towable device to the watercraft. The device and the transducer assembly are configured to glide through an underwater environment at a first depth that is different from a second depth of a hull of the watercraft via the linking mechanism. An example method for creating an overlay for a map or chart is also provided. The method includes receiving sonar data, forming the overlay using the sonar data, and causing presentation of the overlay over the map or chart on a display of a marine electronic device.

21 Claims, 10 Drawing Sheets

(51) Int. Cl.

| | |
|---|---|
| ***B63G 8/42*** | (2006.01) |
| ***B63H 25/04*** | (2006.01) |
| *G06V 10/75* | (2022.01) |
| *G06V 20/05* | (2022.01) |

(56) References Cited

U.S. PATENT DOCUMENTS

| | | | | |
|---|---|---|---|---|
| 10,377,459 | B2 | 8/2019 | Burton et al. | |
| 10,640,187 | B2 * | 5/2020 | Fang | B63G 8/42 |
| 10,864,976 | B2 * | 12/2020 | Burton | B63H 20/12 |
| 11,397,087 | B1 * | 7/2022 | Mishra | B63G 8/42 |

OTHER PUBLICATIONS

Side Scan Sonar—600 KHZ; JW Fishers; retrieved Jan. 23, 2024 from http://www.jwfishers.com/products/sss600.html.

System 3000 Side Scan Sonar: Dual-Frequency Single Beam Sonar; Klein Marine Systems, Inc.; retrieved Jan. 23, 2024 from https://web.archive.org/web/20220709132544/http://www.kleinmarinesystems.com/PDF/datasheets/Klein_System_3000_rev0718.pdf.

DIY Towfish Preview; CSD Solutions LLC; Jan. 5, 2021; retrieved Jan. 23, 2024 from https://www.youtube.com/watch?v=nvOSKF_1-Ew.

* cited by examiner

SUBMERSIBLE DEVICE FOR UNDERWATER SONAR IMAGERY

FIELD

Example embodiments of the present invention generally relate to submersible devices associated with watercrafts and, more particularly to, towable, submersible devices configured to obtain sonar imagery of an underwater environment.

BACKGROUND

In a deep body of water, it is often difficult to detect (and much less identify) objects on a floor of the body of water using traditional sonar transducer assemblies that are positioned at or near a surface of the body of water (such as mounted to a hull of a surface watercraft). Further, when efforts are being made to discover objects such as a human body, time is of the essence, and even if the sonar transducer assemblies are able to detect relevant objects, they are not effective enough to conduct a search and recovery mission of a human body when depths are below a certain level because identification of the objects cannot be feasibly achieved.

Existing towable search and recovery systems are expensive and require specialized software and personnel to operate. Local law enforcement agencies that typically perform search and recovery operations cannot afford to buy such expensive systems and have to wait on hired outside personnel to come in and perform the operations. This often causes time sensitive recovery missions to fail.

Improvements in the foregoing are desired.

BRIEF SUMMARY

The devices, systems, and methods, disclosed herein include a submersible device configured to receive a sonar transducer assembly. In some embodiments, the submersible device is towable beneath a watercraft (e.g., a surface watercraft). Further, such devices and systems are designed to be low-cost by being integrable with other components of the watercraft that are already installed, such as a marine electronic device (among other things). With this low-cost system, local law enforcement agencies are able to afford their own system and then operate it with zero delay time and minimal-to-no training.

Some example embodiments of the disclosure include a towable device for a surface watercraft that has a first portion and a second portion. The first portion has an adaptive mount configured to receive a transducer assembly, and the adaptive mount is further configured to receive at least two different types of transducer assemblies. The towable device also has a connection feature for attachment of a linking mechanism for attachment of the towable device to the surface watercraft. Further, the second portion is configured to encourage the towable device and the transducer assembly to glide through an underwater environment, and the towable device and the transducer assembly are configured to, via the linking mechanism, glide through the underwater environment at a depth that is different from a depth of the hull of the surface watercraft. Some embodiments of the disclosure are further capable of creating a selectable structure map overlay that is different from another structure map overlay that would be creatable using a different transducer assembly that is mounted to the hull of the surface watercraft (e.g., the perspective and detail are different between the overlays since the overlay formed from the submersible is closer to floor of the body of water).

In an example embodiment, a towable device for a watercraft is provided. The towable device includes a first portion comprising an adaptive mount configured to receive at least one transducer assembly, and the adaptive mount is configured to receive at least one of at least two different types of transducer assemblies. The towable device also includes a second portion opposite the first portion and a connection feature for attachment of a linking mechanism for attachment of the towable device to the watercraft. The second portion is configured to encourage the towable device and the at least one transducer assembly to glide through an underwater environment, and the towable device and the at least one transducer assembly are configured to glide through the underwater environment at a first depth that is different from a second depth of a hull of the watercraft via the linking mechanism.

In some embodiments, the second portion of the towable device may include a width and a length, and the width may be smaller than the length.

In some embodiments, the first portion may have a first height that is at least 40 percent smaller than a second height of the second portion.

In some embodiments, the towable device and the at least one transducer assembly may be independently movable with respect to the watercraft.

In some embodiments, gliding of the towable device and the at least one transducer assembly at the first depth may enable an object to be identified using the at least one transducer assembly that would not otherwise be identifiable using a second transducer assembly mounted to the watercraft at the second depth.

In some embodiments, the towable device may be configured to receive an underwater camera for capturing underwater video.

In some embodiments, the linking mechanism may include at least one of a chain, rope, wire, or cable, and the linking mechanism may be at least 20 feet long.

In some embodiments, at least one of the towable device or the linking mechanism further may include an inflatable buoy that is inflatable upon a disturbance to the linking mechanism.

In some embodiments, the at least one transducer assembly may be wirelessly connected to a remote processor.

In some embodiments, the towable device may further include at least one of a propulsion system or a steering system, and at least one of the towable device or the at least one transducer assembly may be connected to a processor that is configured to use machine learning methods to steer the towable device and the at least one transducer assembly so as to identify and move closer to a body or other object of interest.

In some embodiments, the machine learning methods may be configured to automatically adjust the first depth based on upcoming sea floor and navigation information.

In some embodiments, the machine learning methods may be configured to automatically adjust the at least one of the propulsion system or the steering system based on upcoming sea floor and navigation information.

In some embodiments, at least one of the towable device or the at least one transducer assembly may be connected to a processor that is configured to use machine learning methods to steer the towable device and the at least one transducer assembly so as to identify and move closer to a body or other object of interest, and the processor may be further configured to use the machine learning methods to identify the body or other object of interest by comparing features of the body or other object of interest to at least one of a database of information, a predetermined plurality of features, or an image.

In some embodiments, the towable device may further include at least one of a propulsion system or a steering system, and at least one of the towable device or the at least one transducer assembly may be connected to a processor that is configured to automatically change the first depth based on an upcoming depth of an upcoming position.

In some embodiments, the at least one transducer assembly may be usable to create a selectable first structure map overlay that is different from a second structure map overlay created using a second transducer assembly that is mounted to the hull of the surface watercraft.

In some embodiments, a distance between the first depth and the second depth may be between 10 feet and 50 feet.

In some embodiments, the towable device and the at least one transducer assembly may be glidable approximately 5 feet over a floor of a body of water.

In some embodiments, the towable device may include at least one fin.

In some embodiments, the at least one transducer assembly may be removably attachable to the towable device.

In some embodiments, the at least one transducer assembly may be in communication with a marine electronic device.

In another example embodiment, a system for exploring an underwater environment is provided. The system includes a linking mechanism, at least one transducer assembly, and a towable device. The towable device includes a first portion comprising an adaptive mount configured to receive the at least one transducer assembly. The adaptive mount is configured to receive at least one of at least two different types of transducer assemblies. The towable device also includes a second portion opposite the first portion and a connection feature for attachment of the linking mechanism for attachment of the towable device to the surface watercraft. The second portion is configured to encourage the towable device and the at least one transducer assembly to glide through the underwater environment, and the towable device and the at least one transducer assembly are configured to glide through the underwater environment at a first depth that is different from a second depth of a hull of the surface watercraft via the linking mechanism.

In another example embodiment, an assembly is provided. the assembly includes at least one transducer assembly and a towable device. The towable device includes a first portion comprising an adaptive mount configured to receive the at least one transducer assembly, and the adaptive mount is configured to receive at least one of at least two different types of transducer assemblies. The towable device also includes a second portion opposite the first portion and a connection feature for attachment of a linking mechanism for attachment of the towable device to the surface watercraft. The second portion is configured to encourage the towable device and the at least one transducer assembly to glide through an underwater environment, and the towable device and the at least one transducer assembly are configured to glide through the underwater environment at a first depth that is different from a second depth of a hull of the surface watercraft via the linking mechanism.

In another example embodiment, a system for creating an overlay for a map or chart of a body of water is provided. The system includes a marine electronic device and a submersible device comprising at least one transducer assembly. The submersible device is submersible to a first depth that is different than a second depth of a watercraft to which the submersible device is attached. The system also includes one or more processors and a memory including a computer program code configured to when executed, cause the one or more processors to receive sonar data from the at least one transducer assembly of the submersible device and form the overlay for the map or chart using the sonar data. The overlay corresponds to the first depth, and the overlay of the map or chart is different from a second overlay that is created using another transducer assembly mounted to the watercraft at the second depth. The computer program code is also configured to, when executed, cause the one or more processors to cause presentation of the overlay over the map or chart on a display of the marine electronic device.

In some embodiments, forming the overlay may include removing data corresponding to a water column that spans from the second depth to a floor of the body of water.

In some embodiments, causing presentation of the overlay may include causing presentation of the overlay in response to a selection having been made by a user to do so.

In some embodiments, the processor may be further configured to cause the submersible device to navigate through an underwater environment of the body of water along a desired path.

In some embodiments, the submersible device may further include an adapter configured to removably attach to the at least one transducer assembly.

In some embodiments, the submersible device may include at least one fin.

In some embodiments, at least part of the submersible device may be comprised of plastic.

In some embodiments, the submersible device may be attached to the watercraft by way of at least one of a chain, rope, wire, or cable.

In some embodiments, at least one of the submersible device or the at least one of the chain, rope, wire, or cable may further include an inflatable buoy that is inflatable upon a disturbance to the at least one of the chain, rope, wire, or cable.

In some embodiments, the submersible device may be wirelessly connected to the marine electronic device.

In some embodiments, a portion of the submersible device may include a width and a length, and the width may be substantially smaller than the length.

In some embodiments, a first portion of the submersible device may have a first height that is at least 40 percent smaller than a second height of a second portion of the submersible device, the second portion being opposite the first portion.

In some embodiments, the submersible device may further include a camera.

In some embodiments, the submersible device may further include at least one of a propulsion system or a steering system, and the processor may be further configured to use machine learning methods to steer the submersible device so as to identify and move closer to a body or other object of interest.

In some embodiments, the machine learning methods may be configured to automatically adjust the first depth based on knowledge of upcoming sea floor and navigation information.

In some embodiments, the machine learning methods may be configured to automatically adjust the at least one of the propulsion system or the steering system based on knowledge of upcoming sea floor and navigation information.

In some embodiments, the submersible device may further include at least one of a propulsion system or a steering system, and the processor may be further configured to use the machine learning methods to identify the body or other object of interest by comparing features of the body or the other object of interest to at least one of a database of information, a predetermined plurality of features, or an image.

In some embodiments, the processor may be positioned within the submersible device.

In some embodiments, the processor may be positioned within the marine electronic device.

In some embodiments, the processor may be positioned at a remote location.

In another example embodiment, a marine electronic device is provided. The marine electronic device includes one or more processors and a memory including a computer program code configured to when executed, cause the one or more processors to receive sonar data from at least one transducer assembly of a submersible device. The submersible device is submersible to a first depth that is different than a second depth of a watercraft to which the submersible device is attached. The computer program code is also configured to, when executed, cause the one or more processors to form an overlay for a map or chart using the sonar data. The overlay corresponds to the first depth, and the overlay is different from a second overlay that is created using another transducer assembly mounted to the watercraft at the second depth. The computer program code is also configured to, when executed, cause the one or more processors to cause presentation of the overlay over the map or chart on a display of the marine electronic device.

In another example embodiment, a method for creating an overlay for a map or chart is provided. The method includes receiving sonar data from at least one transducer assembly of a submersible device. The submersible device is submersible to a first depth that is different than a second depth of a watercraft to which the submersible device is attached. The method also includes forming the overlay for the map or chart using the sonar data. The overlay corresponds to the first depth, and the overlay is different from a second overlay that is created using another transducer assembly mounted to the watercraft at the second depth. The method also includes causing presentation of the overlay over the map or chart on a display of the marine electronic device.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION

Figure 1:
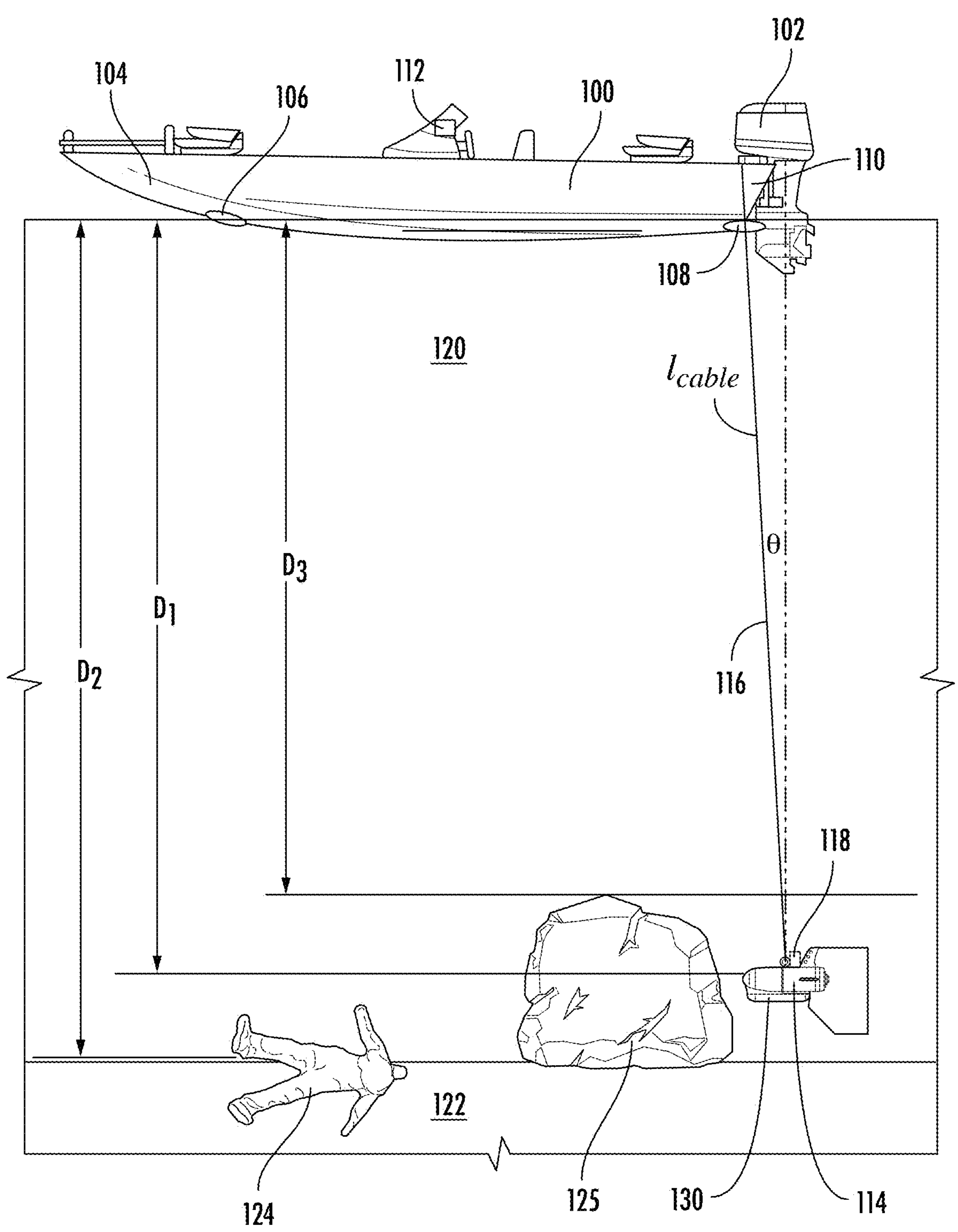
FIG. 1 illustrates an example watercraft with an example submersible device attached thereto in towed configuration, in accordance with some embodiments described herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

FIG. 1 illustrates a surface watercraft 100 on a body of water 120. The watercraft includes a marine electronic device 112 such as may be utilized by a user to interact with, view, or otherwise control various aspects of the watercraft and its various marine systems described herein. In the illustrated embodiment, the marine electronic device 112 is positioned proximate the helm of the watercraft 100—although other places on the watercraft 100 are contemplated. Likewise, additionally or alternatively, a user's mobile device may include functionality of a marine electronic device.

Depending on the configuration, the watercraft 100 may include a main propulsion motor 102, such as an outboard or inboard motor. Additionally, the watercraft 100 may include a trolling motor configured to propel the watercraft 100 or maintain a position. The motor 102 and/or the trolling motor may be steerable using a steering wheel, or in some embodiments, the watercraft 100 may have a navigation assembly that is operable to steer the motor 102 and/or the trolling motor. The navigation assembly may be connected to a processor and/or be within a marine electronic device 112, or it may be located anywhere else on the watercraft 100. Alternatively, it may be located remotely.

In some embodiments, the watercraft 100 may have a sonar transducer assembly disposed thereon. For example, a sonar transducer assembly 106 may be disposed on a hull 104 of the watercraft 100, and/or a sonar transducer assembly 108 may be disposed on a stern 110 of the watercraft 100. Further, one or more sonar transducers may be disposed anywhere else on the watercraft 100. The sonar transducer assemblies may be configured to transmit signals into the underwater environment and receive sonar return data generated by receipt of sonar return signals. A processor may then generate, based on the sonar return data, sonar image data corresponding to generation of at least one sonar image of the underwater environment. The sonar data and/or image(s) that are generated may then be displayed on a screen of a marine electronic device.

The watercraft 100 may be connected to a submersible and/or towable device 114. The device 114 may be connected to any portion of the watercraft 100, such as the stern 110, the hull 104, or any other portion of the watercraft 100. For example, the device 114 may have a connection feature 132 (shown in FIG. 2A) for attachment of a linking mechanism 116 for attachment of the device 114 to the watercraft 100. In some embodiments, the linking mechanism 116 may include a chain, a rope, a wire, and/or a cable. Further, in some embodiments, the transducer assembly 130 may be in communication with the marine electronic device 112. For example, in the embodiment shown in FIG. 1, the linking mechanism 116 includes a rope and a cable. The cable is configured to connect the transducer assembly 130 to the marine electronic device 112, and the rope is configured to tow the device 114 from the stern 110 of the watercraft 100. In some other embodiments, the device 114 may not be connected to the watercraft 100 at all. Rather, the device 114 may be wirelessly connected to the watercraft 100 and/or the marine electronic device 112. Other configurations are also contemplated within the scope of this disclosure.

The device 114 may be configured to image a floor 122 of the body of water 120. Further, in some embodiments, the device 114 may be configured to conduct activities such as search and recovery missions to, e.g., find, identify, and extract a body 124. Although the embodiment in FIG. 1 shows the body 124 being searched for (for rescue purposes), in other embodiments, the device 114 may be used to conduct exploration missions, obtain higher definition imagery, or conduct any other type of mission. The device 114 may have a sonar transducer assembly 130 mounted thereto. The sonar transducer assembly 130 may be configured to transmit signals into the underwater environment and receive sonar return data generated by receipt of sonar return signals. A processor may then generate, based on the sonar return data, sonar image data corresponding to generation of at least one sonar image of the underwater environment. The sonar data and/or image(s) that are generated may then be displayed on a screen of a marine electronic device.

In some embodiments, the linking mechanism 116 may be configured such that the device 114 travels through the body of water 120 at a certain depth. In the embodiment shown in FIG. 1, for example, the device 114 and the transducer assembly 130 are configured to glide through the body of water 120 at a first depth $D_1$ that is different from a second depth $D_2$ of the hull 104 of the watercraft 100 via the linking mechanism 116. For example, the linking mechanism may be 20 feet such that the first depth $D_1$ may be 18 feet. Further, the second depth $D_2$ may be approximately 23 feet, such that the device 114 glides approximately 5 feet over the floor 122 of the body of water 120. It should be appreciated that, in other embodiments, the first depth $D_1$ and the second depth $D_2$ may be vastly different based on circumstances. For example, a distance between the first depth $D_1$ and the second depth $D_2$ may be between 10 feet and 50 feet. Further, the first depth $D_1$ could be 50 feet or more in some embodiments, and in other embodiments, the first depth $D_1$ may be 5 feet or less. Other depths are also contemplated within the scope of this disclosure.

In some embodiments, a gliding of the device 114 and the transducer assembly 130 at the first depth $D_1$ may enable an object (such as the body 124) to be identified that would not be identifiable using a second transducer assembly (such as the transducer assembly 106 or the transducer assembly 108) that is mounted to the watercraft 100 at the second depth $D_2$. For example, it might be difficult to detect (and much less identify) objects on the floor 122 of the body of water 120 using traditional sonar transducer assemblies that are positioned at or near a surface of the body of water (e.g., the transducer assembly 106 and/or the transducer assembly 108). Further, when efforts are being made to discover objects such as the human body 124, time is typically of the essence, and even if the sonar transducer assemblies (e.g., the transducer assembly 106 and/or the transducer assembly 108) are able to detect the presence of potentially relevant objects, they are not effective enough to conduct a search and recovery mission of the human body 124 when depths are below a certain level. The transducer assembly 130 on the device 114, however, being towed at the first depth $D_1$ (and other related depths), can obtain sonar imagery with enough clarity to efficiently identify the body 124 as in fact being a human body.

In some embodiments, a processor may be connected to at least one of the device 114 or the transducer assembly 130, and the processor may be configured to cause the first depth $D_1$ to vary based on one or more factors (e.g., based on upcoming sea floor information, navigation data, and/or user input, among other factors). Further, in some embodiments, as will be described herein, the processor may use machine learning methods to do so. In other embodiments, the processor may do so based solely on received user input.

In some embodiments, the device 114 and/or the linking mechanism 116 may include an inflatable buoy 118 that is inflatable upon a disturbance to the linking mechanism 116. For example, the inflatable buoy 118 may be configured to detect an unwanted disturbance to the linking mechanism 116 and/or the device 114 (e.g., such as by way of an accelerometer, a received signal, or any other method) and then inflate to cause the device 114 to float to the surface of the body of water 120 so that a user can repair and/or retrieve the device 114. Although the device 114 in FIG. 1 includes the inflatable buoy 118, it should be appreciated that the inflatable buoy 118 may be optional and that it is not necessary. Further, other safety mechanisms are also contemplated within the scope of this disclosure. For example, in some embodiments, a system may not have an inflatable buoy 118 but may be configured to automatically reel in the device 114 upon detection of a disturbance. Other safety mechanisms are also contemplated within the scope of this disclosure to retrieve and/or preserve the device 114 when unexpected circumstances occur.

Figure 2A:
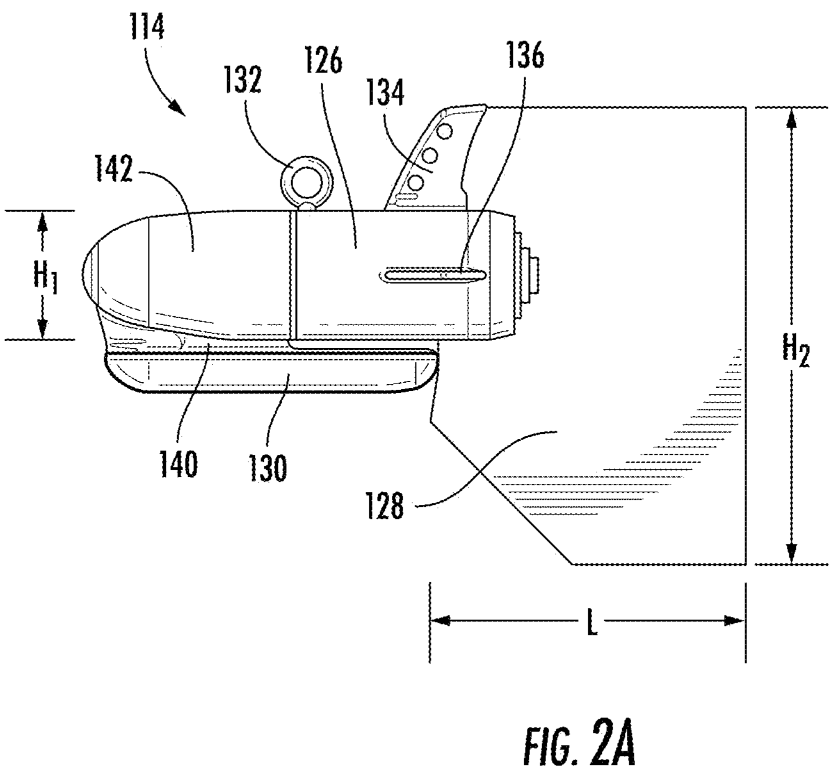
FIG. 2A illustrates the device of FIG. 1 with a first type of transducer mounted thereon, in accordance with some embodiments discussed herein.

FIG. 2A illustrates a zoomed-in view of the device 114 with the transducer assembly 130 mounted thereto. The device 114 may include a first portion 126 that includes an adaptive mount 140 configured to receive the transducer assembly 130. The device 114 may also include a second portion 128 that is opposite the first portion 126 and is configured to encourage the device 114 and the transducer assembly 130 to glide through an underwater environment (e.g., through the body of water 120 in FIG. 1). The device 114 may further have a connection feature 132 for attachment of a linking mechanism (e.g., the linking mechanism 116 shown in FIG. 1) for attachment of the device 114 to the watercraft 100.

In some embodiments, the device 114 may have one or more fins. For example, in the embodiment shown in FIG. 2A, the second portion 128 includes a first fin 134 on a top of the second portion 128 of the device 114 and a second fin 136 on a side of the second portion 128 of the device 114. Although not shown, the second portion 128 also includes another fin opposite the second fin 136 on the other side of the second portion 128 of the device 114. In other embodiments, the second portion 128 may have more or less fins. For example, the second portion 128 may include four or more fins, or the second portion 128 may not include any fins at all. Additionally or alternatively, the first portion 126 may include one or more fins in some embodiments. Further, one or more fins may be steerable, as will be described in more detail herein with respect to FIG. 3. Other configurations are also contemplated within the scope of this disclosure.

In some embodiments, the first portion 126 may have a first height $H_1$ that is at least 40 percent smaller than a second height $H_2$ of the second portion 128. Such dimensions may cause the second portion 128 to act as a stabilizing and/or steering component to the device 114. Further, the second portion 128 of the device 114 may have a width (e.g., into the page) and a length L, and the width may be smaller than the length L (e.g., such that the second portion 128 has a thinness like a tail or a fin). It should be appreciated, however, that in other embodiments, the first portion 126 and the second portion 128 of the device 114 may have different first and second heights $H_1$ and $H_2$, respectively, and the second portion 128 may have a different width to length L ratio.

In some embodiments, some or all of the device 114 may be comprised of plastic. However, in other embodiments, parts of the device 114 may be comprised of metal or any other material.

Figure 2B:
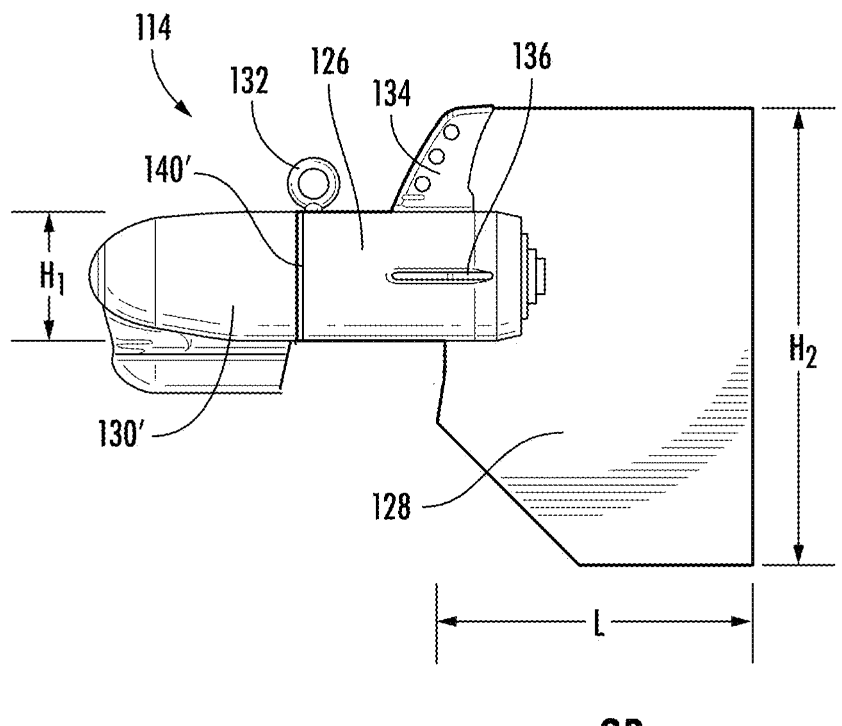
FIG. 2B illustrates the device of FIGS. 1 and 2A with a second type of transducer mounted thereon, in accordance with some embodiments discussed herein.

In some embodiments, the transducer assembly 130 may be removably attachable to the device 114. For example, in addition to the first portion 126 having an adaptive mount 140 configured to receive the transducer assembly 130, the adaptive mount 140 may be further configured to be able to disengage with the transducer assembly 130 so that it can be reattached later. Further, in some embodiments, the adaptive mount 140 may be configured to receive at least one of at least two different types of transducer assemblies (e.g., enabling customized sonar imagery to be provided using the device 114—such as linear sidescan vs. linear downscan vs. conical downscan vs. live down view, among others). For example, FIG. 2B illustrates the same device 114 with the same first portion 126 and the same second portion 128 as that shown in FIG. 2A. However, the adaptive mount 140' has been modified to remove the nosecone portion 142 of the adaptive mount 140 (as shown in FIG. 2A) such that a different type of transducer assembly 130' can be mounted to the first portion 126 of the device 114. The transducer assembly 130' in FIG. 2B is a type of transducer assembly that already has a nosecone portion that is similar to the nosecone portion 142 of the adaptive mount 140 in FIG. 2A. Thus, the nosecone portion 142 of the adaptive mount 140 is not needed for mounting of the transducer assembly 130' to the device 114. It should be appreciated that the adaptive mounts 140 and/or 140' may be configured to accommodate additional types of transducer assemblies. Further, other adaptive mounts are also contemplated within the scope of this disclosure.

Figure 3:
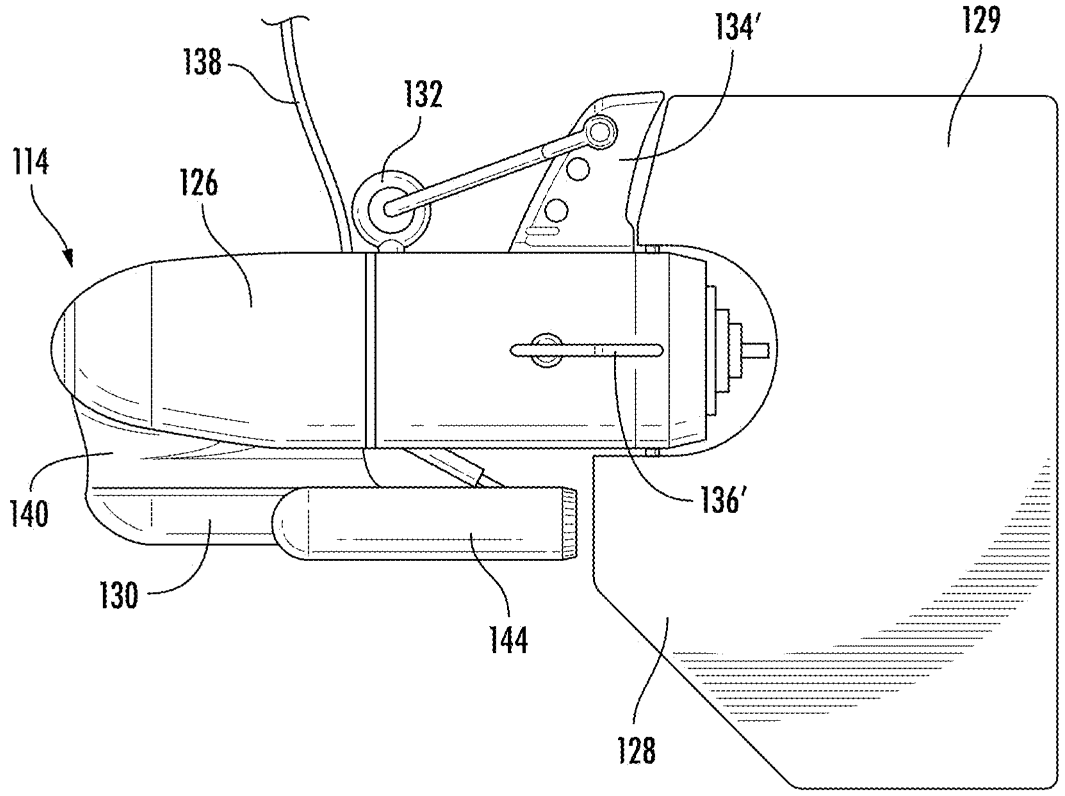
FIG. 3 illustrates the device of FIG. 2A having a propulsion system and a steering system, in accordance with some embodiments discussed herein.

In some embodiments, the device 114 and the transducer assembly 130 may be independently movable with respect to the watercraft 100. For example, FIG. 3 illustrates the device 114 of FIGS. 1 and 2A further including a propulsion system and a steering system. The steering system includes a first steerable fin 134' and a second steerable fin 136'. Although not shown, the steering system also includes a third steerable fin on the other side of the second portion 128. Additionally, a back portion 129 of the second portion 128 is also steerable. The propulsion system may include the propulsion jets 144 that are disposed on the first portion 126. It should be appreciated that, in other embodiments, only one or neither of the steering system or the propulsion system may be included. Further, in some other embodiments, other types of steering systems or propulsion systems may be used.

In some embodiments, the device 114 and/or the transducer assembly 130 may be connected to a processor that is configured to automatically change the first depth $D_1$ based on a third depth $D_3$ of an upcoming position. For example, referring back to FIG. 1, the processor may be configured to detect a presence of a boulder 125 on the floor 122 of the body of water 120 as hindering the path of the device 114. The processor may make such a determination in a number of ways. For example, the processor may use upcoming sea floor data and/or navigation information to estimate an optimal depth at which to cause the device 114 to travel. Additionally or alternatively, the processor may use machine learning methods to make such determinations, as will be described in more detail herein with respect to FIG. 7. The machine learning methods and/or the processor may be configured to automatically adjust the first depth $D_1$, the propulsion system, and/or the steering system based on knowledge of upcoming sea floor and navigation information.

Additionally or alternatively, the device 114 may be configured to use machine learning methods to steer the device 114 and the transducer assembly 130 so as to identify and move closer to a body (e.g., the body 124 in FIG. 1) or other object of interest. Further, in some embodiments, the processor may be further configured to use the machine learning methods to identify the body (e.g., the body 124 shown in FIG. 1) or other object of interest by comparing features of the body or other object of interest to at least one of a database of information, a predetermined plurality of features, or an image. For example, a user may upload an image of the human body that is being searched or may input features such as a gender, hair color, or size of the body that is being searched. Or, no inputs may be given to the processor, and machine learning methods may be used to rule out objects found on a floor of the body of water until a human body is found. Other objects may be searched for as well, such as a piece of jewelry, a sunken watercraft, or any other object.

Other features of the device 114 are also contemplated. For example, the device 114 may be further configured to mount/hold an underwater camera for capturing underwater video. Such underwater video footage may be used, for example, by a processor and/or machine learning methods to determine an optimal depth level for the device 114 and/or to identify and/or move closer to a body (e.g., the body 124 shown in FIG. 1) or other object of interest. Other features are also contemplated within the scope of this disclosure.

Figure 4B:
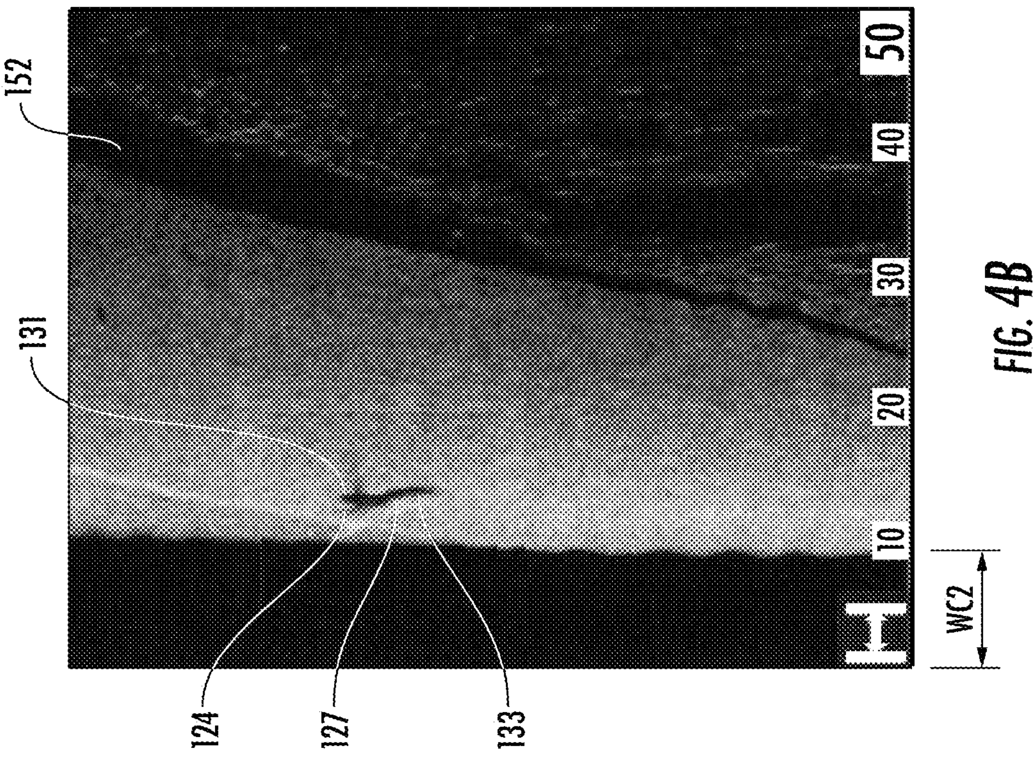
FIG. 4B is a sonar image produced by a transducer assembly mounted on the submersible device of FIG. 1, in accordance with some embodiments discussed herein.
Figure 4A:
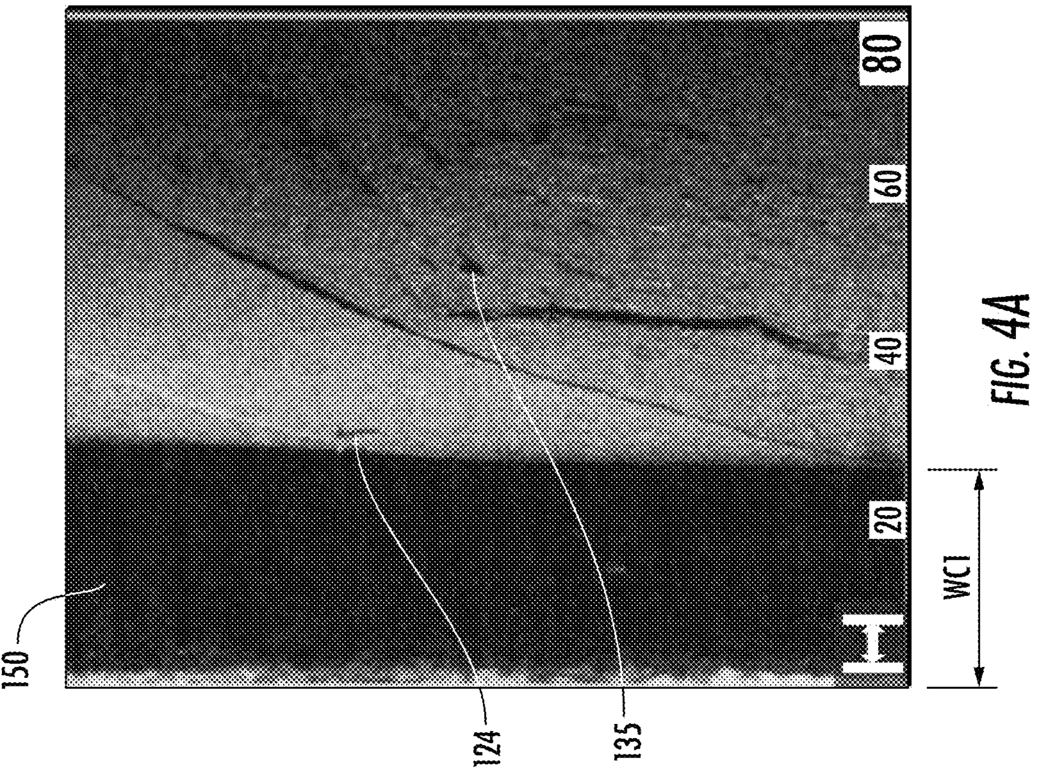
FIG. 4A is a sonar image produced by a transducer assembly mounted on the watercraft of FIG. 1, in accordance with some embodiments discussed herein.

FIGS. 4A-4B show sonar images corresponding to the transducer assembly 106, which is mounted to the hull 104 of the watercraft 100 as shown in FIG. 1 (FIG. 4A), and the transducer assembly 130, which is mounted to the device 114 as shown in FIG. 1 (FIG. 4B). FIG. 4A is a sonar image 150 obtained using the transducer assembly 106 mounted to the hull 104 of the watercraft 100, and FIG. 4B is a sonar image 152 obtained using the transducer assembly 130 mounted to the device 114. The sonar image 150 of FIG. 4A includes a first water column WC1 to the left of the depiction of the floor 122, and the sonar image 152 of FIG. 4B includes a second water column WC2 to the left of the depiction of the floor 122. Notably, the sonar image 152 gives a more zoomed in view than the sonar image 150, although both the sonar image 150 and the sonar image 152 depict sonar imagery for the same general area on the floor 122 of the body of water 120. This is because the transducer assembly 130 is closer to the floor 122 than the transducer assembly 106 (e.g., see FIG. 1). As such, the first water column WC1 is greater than the second water column WC2. Further, as shown in both of FIGS. 4A-4B, the body 124 (as also shown in FIG. 1) can be seen. However, in the sonar image 150, the body 124 is not identifiable as being a body. In the sonar image 152, however, the body 124 is more identifiable as (at least potentially being) a human body. That is, in the sonar image 150, the body 124 occupies very few pixels on the screen, but in the sonar image 152, the body 124 occupies many more pixels on the screen. For example, two legs 127 and 133 and a shadow 131 of a head can be seen in the sonar image 152. The difference between the depictions of the body 124 in FIG. 4A and FIG. 4B are important because, if the sonar image 150 of FIG. 4A were the only available image, a user may disregard it as being merely a piece of debris such as the debris 135 in FIG. 4A. The clearer view of FIG. 4B gives the user (and/or machine learning system) a better chance at accurately detecting the object being searched (e.g., detecting the body 124 as being a human body).

Figure 5A:
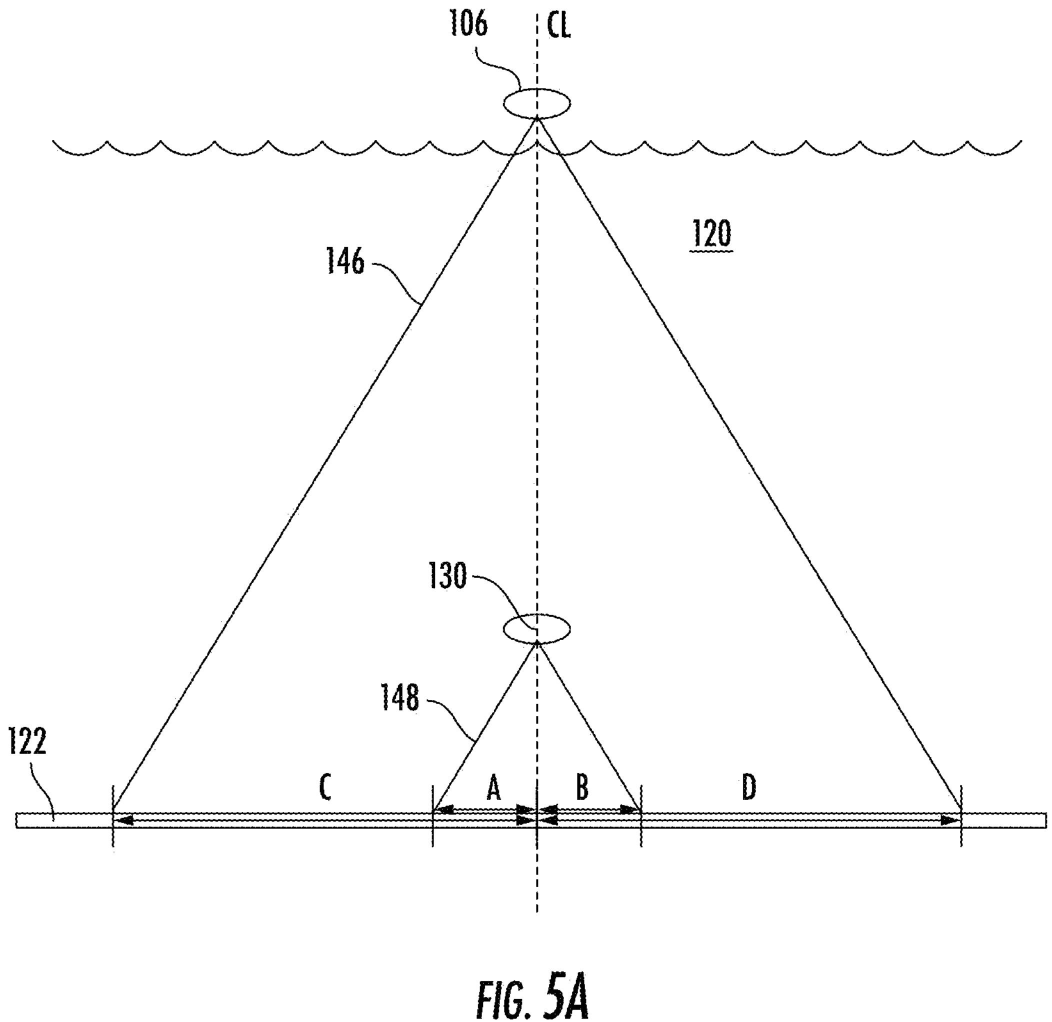
FIG. 5A illustrates the difference between the sonar coverage of the transducer assembly used to produce FIG. 4A and the sonar coverage of the transducer assembly used to produce FIG. 4B using downscan transducer assemblies, in accordance with some embodiments discussed herein.
Figure 5B:
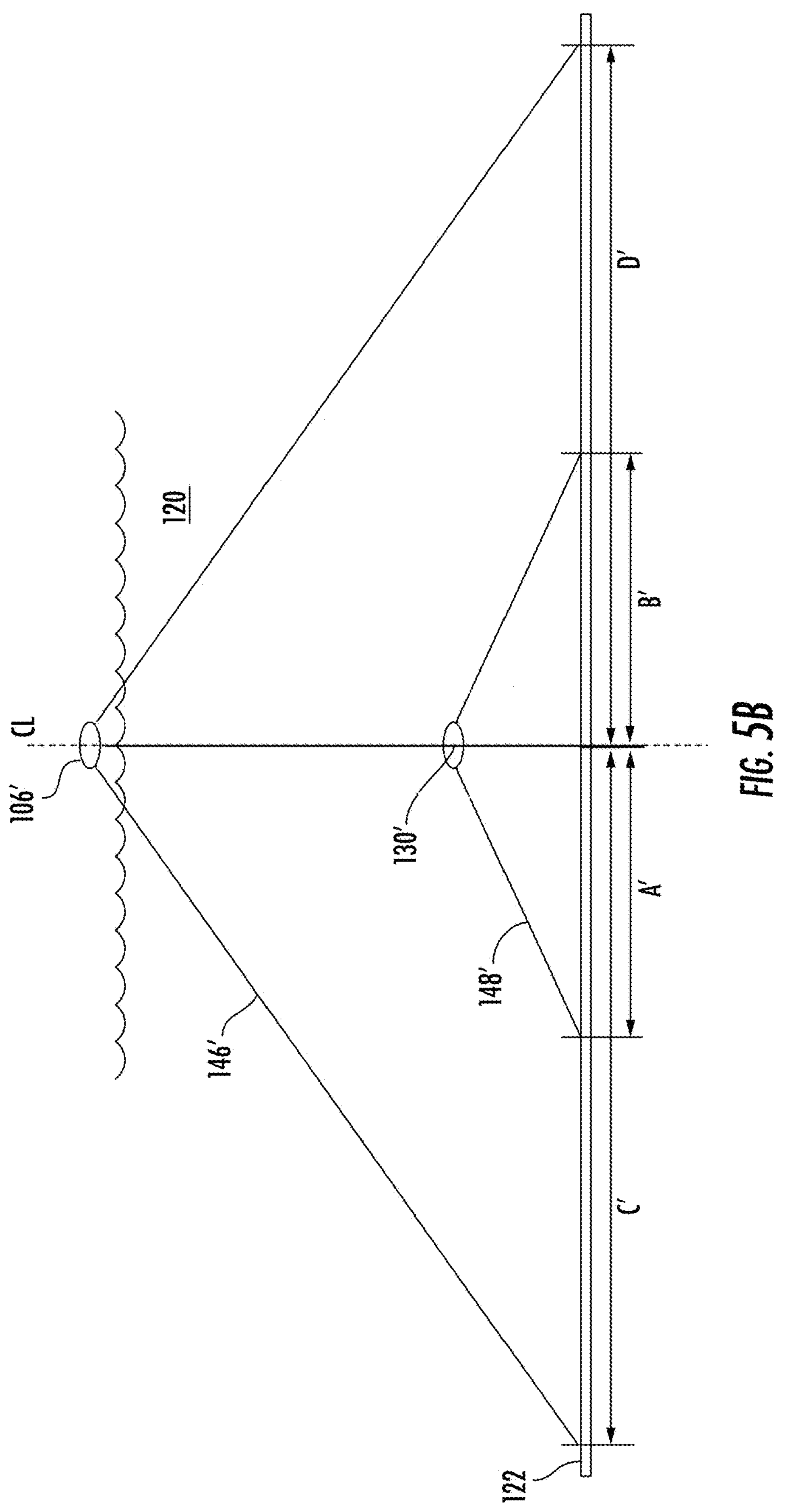
FIG. 5B illustrates the difference between the sonar coverage of the transducer assembly used to produce FIG. 4A and the sonar coverage of the transducer assembly used to produce FIG. 4B using sidescan transducer assemblies, in accordance with some embodiments discussed herein.

FIGS. 5A-5B illustrate differences in sonar coverage of the transducer assembly 106, which is mounted to the hull 104 of the watercraft 100 as shown in FIG. 1, and the transducer assembly 130, which is mounted to the device 114 as shown in FIG. 1. FIG. 5A shows the transducer assembly 106 and the transducer assembly 130 as being downscan transducer assemblies, and FIG. 5B represents the transducer assembly 106' and the transducer assembly 130' as being sidescan transducer assemblies. For example, in FIG. 5A, the downscan transducer assembly 106 mounted to the hull 104 of the watercraft 100 produces a sonar coverage 146, which has a breadth C plus D. The length C represents a length of sonar coverage across the floor 122 from the centerline CL out to the left, and the length D represents a length of sonar coverage across the floor 122 from the centerline CL out to the right. In the sonar imagery produced by the downscan transducer assembly 106, the full breadth of C plus D is compressed into a narrow image portion that is updated historically. The resulting sonar imagery for the downscan transducer assembly 106 is a single sonar image. The downscan transducer assembly 130 mounted to the device 114, which is being towed beneath the watercraft 100 at a distance of approximately 5 feet above the floor 122 of the body of water 120 (as shown in FIG. 1), produces a sonar coverage 146, which has a breadth A plus B. The length A represents a length of sonar coverage across the floor 122 from the centerline CL out to the left, and the length B represents a length of sonar coverage across the floor 122 from the centerline CL out to the right. In the sonar imagery produced by the downscan transducer assembly 130, the full breadth of A plus B is also compressed into a narrow image portion that is updated historically. The resulting sonar imagery for the downscan transducer assembly 130 is also a single sonar image. As can be seen, there is less coverage for the downscan transducer assembly 130 and, thus, the sound energy reflecting off the floor 122 will be greater, resulting in greater resolution in the sonar imagery. Because both downscan transducer assemblies 106 and 130 compress data from the full breadth of their coverages into a single sonar image, though, it can be difficult to determine where along the floor 122 a body or an object is located (although it can be helpful to determine if a body or object is in the vicinity).

In FIG. 5B, the sidescan transducer assembly 106' mounted to the hull 104 of the watercraft 100 produces a sonar coverage 146', which has separate breadths C' and D'. The length C' represents a length of sonar coverage across the floor 122 offset from the centerline CL out to the left, and the length D' represents a length of sonar coverage across the floor 122 offset from the centerline CL out to the right. In the sonar imagery produced by the sidescan transducer assembly 106', the breadth of C' is compressed into a first image portion that is updated historically, and the breadth of D' is compressed into a second image portion that is updated historically. The resulting sonar imagery for the sidescan transducer assembly 106' is a two different sonar images that are displayed in a side-by-side manner. The sidescan transducer assembly 130' mounted to the device 114, which is being towed beneath the watercraft 100 at a distance of approximately 5 feet above the floor 122 of the body of water 120, produces a sonar coverage 146', which has separate breadths A' and B'. The length A' represents a length of sonar coverage across the floor 122 offset from the centerline CL out to the left, and the length B' represents a length of sonar coverage across the floor 122 offset from the centerline CL out to the right. In the sonar imagery produced by the sidescan transducer assembly 130', the breadth of A' is compressed into a first image portion that is updated historically, and the breadth of B' is compressed into a second image portion that is updated historically. The resulting sonar imagery for the sidescan transducer assembly 130' is a two different sonar images that are displayed in a side-by-side manner. As can be seen, there is less coverage for the sidescan transducer assembly 130' and, thus, the sound energy reflecting off the floor 122 will be greater, resulting in greater resolution in the sonar imagery.

As can be seen through a comparison of FIGS. 5A-5B, the coverages of the downscan transducer assemblies 106 and 130 are narrower than the coverages of the sidescan transducer assemblies 106' and 130'. Further, because the sidescan transducer assemblies 106' and 130' produce two sonar images each, instead of the one sonar image produced by each of the downscan transducer assemblies 106 and 130, a wider range can be scanned when using the sidescan transducer assemblies 106' and 130' in order to better pinpoint where an object is located along the floor 122. Moreover, a same body looks different on sonar imagery from a downscan transducer assembly than it does on sonar imagery from a sidescan transducer assembly. It may therefore be advantageous to use different types of transducer assemblies depending on the type of object identification that is desired. For example, a sidescan transducer assembly may be more useful to a machine learning system that is being used to identify an object as being a human body rather than a rock, since the sidescan transducer assembly produces a more stretched-out sonar image. As another example, a downscan transducer assembly may be more desirable in situations where any object needs to be detected on a floor with little to no other debris present.

Figure 6A:
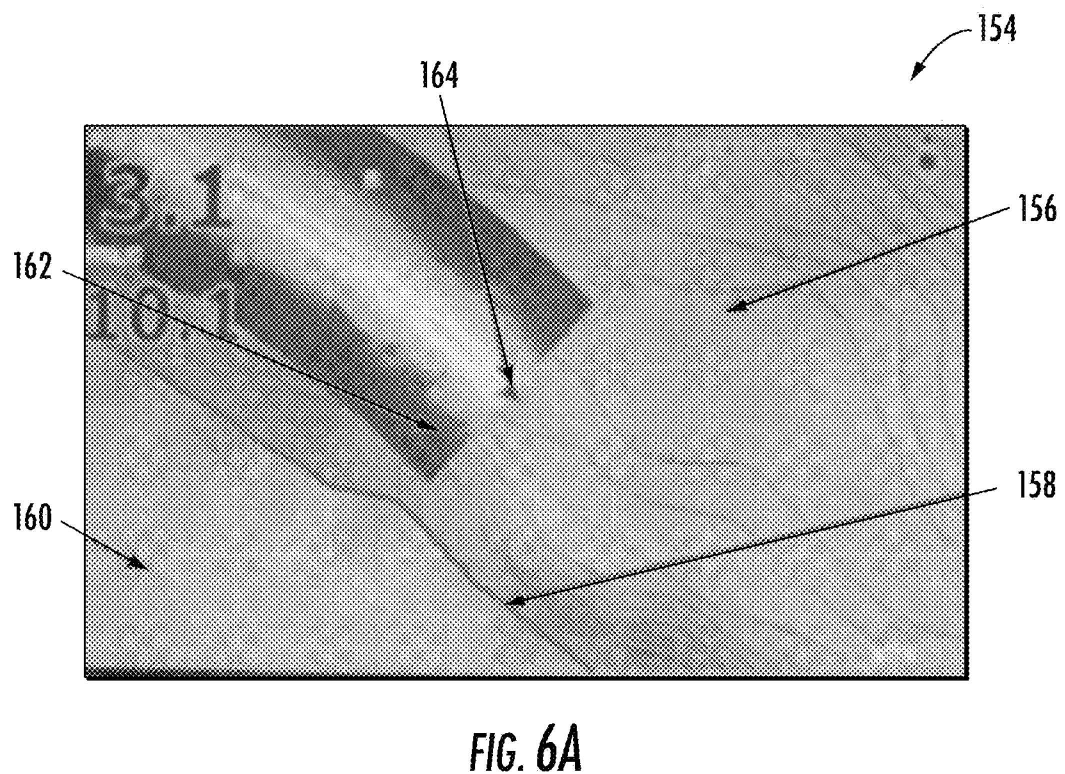
FIG. 6A is an overlay created using the transducer assembly used to produce FIG. 4A, in accordance with some embodiments discussed herein.
Figure 6B:
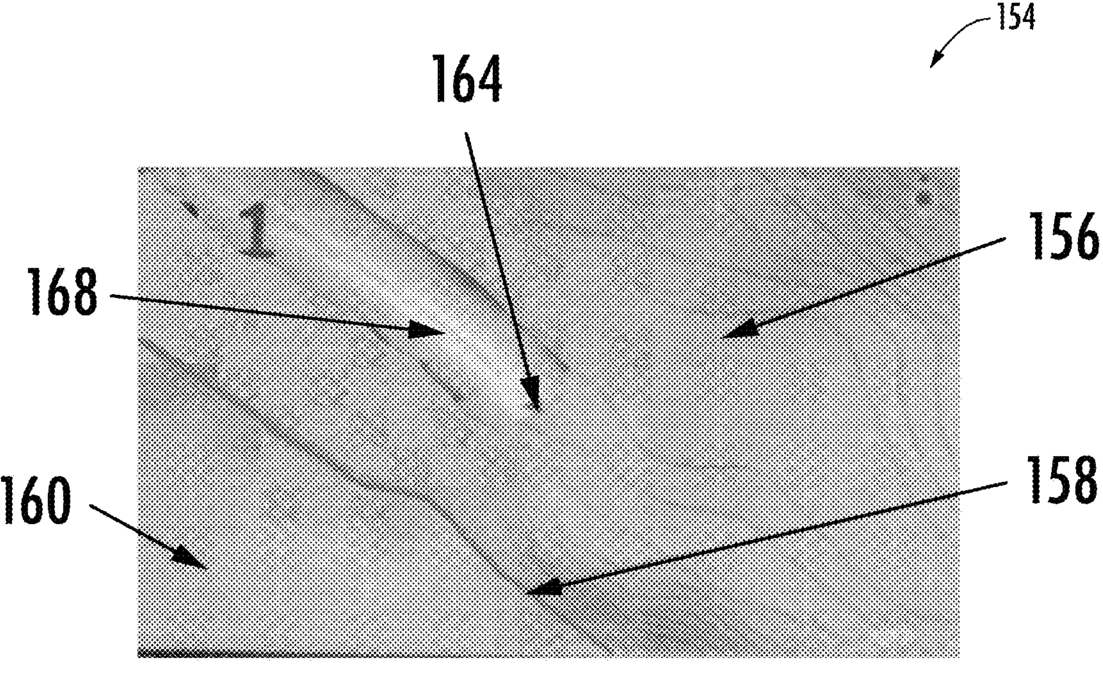
FIG. 6B is an overlay created using the transducer assembly used to produce FIG. 4B, in accordance with some embodiments discussed herein.

In some embodiments, the transducer assembly 106 may be usable to create a selectable first structure map overlay 162 (e.g., an overlay for a map or chart) that is different from a second structure map overlay 168 that is creatable using the transducer assembly 130. For example, FIG. 6A shows the first structure map overlay 162, which was developed using sonar data from the transducer assembly 106, and FIG. 6B shows the second structure map overlay 168, which was developed using sonar data from the transducer assembly 130. The structure map overlays 162 and 168 may be formed from downscan or sidescan transducer assemblies (although FIGS. 6A-6B show structure map overlays developed using sidescan transducer assemblies). To do this, a processor may be configured to receive sonar data from a transducer assembly (e.g., the transducer assembly 106 and/or the transducer assembly 130) and then form an overlay (e.g., the overlay 162 and/or the overlay 168) for the structure map 154 using the sonar data. In some embodiments, the overlay may be formed by removing sonar data corresponding to a water column such that only the sonar imagery associated with the floor of the body of water is in the overlay.

The first structure map overlay 162, which is determined using the transducer assembly 106, may correspond to a depth of at least one of the hull 104 or the marine electronic device 112 of the watercraft 100 (as shown in FIG. 1) and may represent some or all of the breadths C and D as shown in FIG. 5. The second structure map overlay 168, which is determined using the transducer assembly 130, may correspond to the first depth $D_1$ (as shown in FIG. 1) and may represent some or all of the breadths A and B as shown in FIG. 5.

The first structure map overlay 162 is different from the second structure map overlay 168 in a way that is similar to the difference in the sonar images 150 and 152 with respect to FIGS. 4A-4B. For example, the first structure map overlay 162 may be formed by a processor by first receiving data such as that shown in FIG. 4A, which is representative of breadth D in FIG. 5, and removing the water column WC1 from such data. The processor may then receive data representative of breadth C in FIG. 5 and then remove the water column from such data. The data representative of breadths C and D, with the water columns removed, may then be combined (e.g., place side-by-side) to form the first structure map overlay 162 which is presented over the chart 156 shown in FIG. 6A. Similarly, the second structure map overlay 168 may be formed by the processor by first receiving data such as that shown in FIG. 4B, which is representative of breadth B in FIG. 5, and removing the water column WC2 from such data. The processor may then receive data representative of breadth A in FIG. 5 and then remove the water column from such data. The data representative of breadths A and B, with the water columns removed, may then be combined (e.g., place side-by-side) to form the second structure map overlay 168, which is presented over the chart 156 shown in FIG. 6B.

In some embodiments, the processor may cause one or more overlays to be presented on a display (e.g., of a marine electronic device 112), such as in response to a selection having been made by a user. For example, one or more structure map overlays may be presented in response to a selection having been made by a user to do so. As another example, one or more structure map overlays may be presented in response to an instruction from a machine learning method or an automated process. Other presentation methods are also contemplated within the scope of this disclosure.

The processor may also be configured to cause the submersible device 114 to navigate through an underwater environment along a desired path using, e.g., a user-controlled remote, a system such as navigation system, global positioning system (GPS), radar, and/or machine learning. This would enable movement of the submersible device 114 to occur in a routine manner (e.g., to ensure that all areas in a search perimeter are covered). This may also enable movement of the submersible device 114 to occur in response to data that has been interpreted such as in FIGS. 4A-4B and/or FIGS. 6A-6B. For example, a user may (and/or the processor may automatically) navigate closer to the body 124 once it has been identified using the sonar data from the transducer assembly 130.

It should be appreciated that the processors discussed herein may be positioned anywhere. For example, a processor may be positioned within a submersible device (such as submersible device 114), within a marine electronic device (such as marine electronic device 112), or at a remote location.

Example Use of Artificial Intelligence

Figure 7:
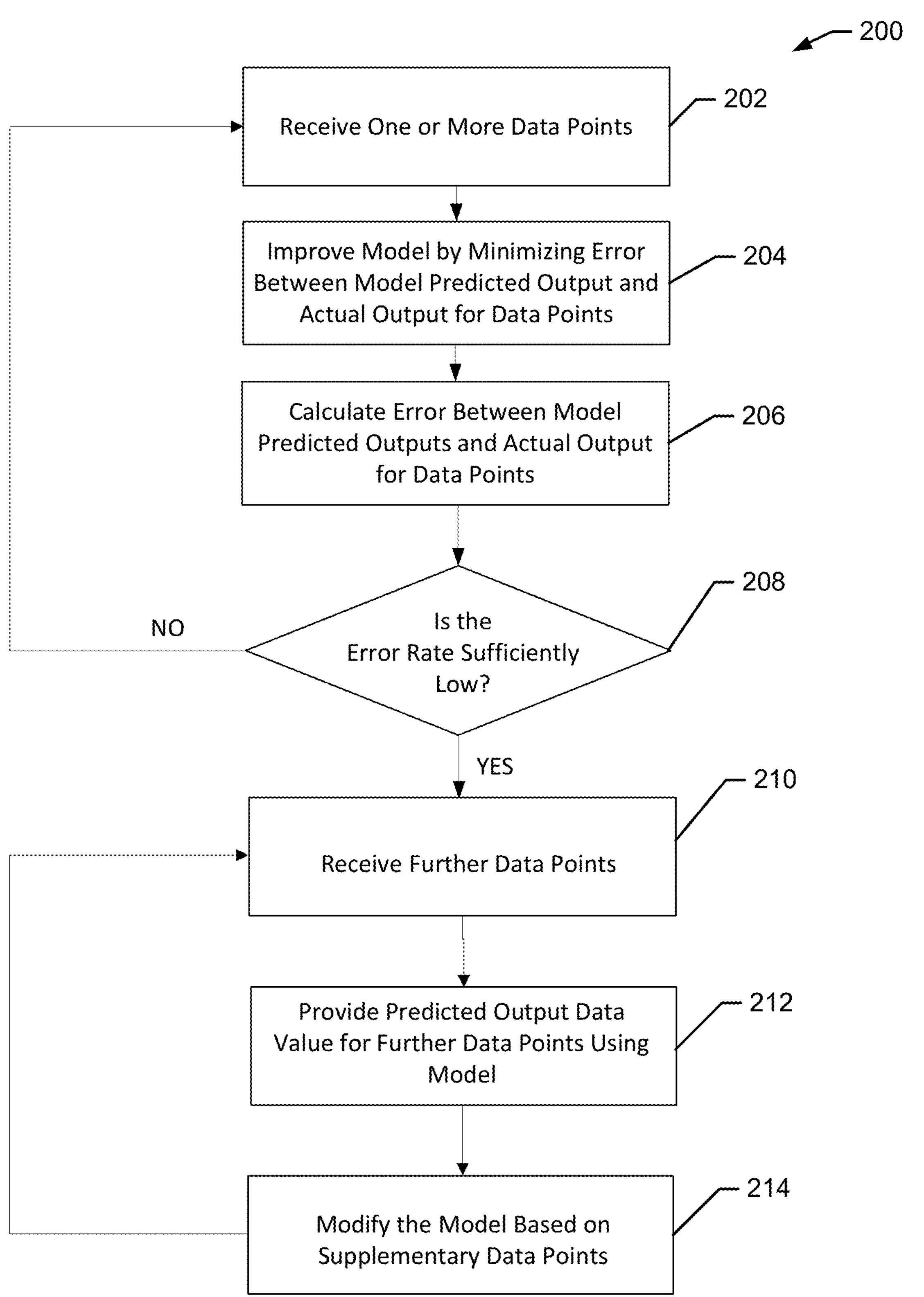
FIG. 7 illustrates a flowchart of an example method of machine learning, in accordance with some embodiments discussed herein.

FIG. 7 is a flowchart of an example method 200 of machine learning, such as may be utilized with artificial intelligence for various embodiments of the present invention. At least one processor or another suitable device may be configured to develop a model for, e.g., the determination of a depth and/or a direction of a device and/or identification of an object, among other determinations, such as described herein in various embodiments. In this regard, the developed model may be deployed and utilized to determine a depth and/or a direction of a device, and/or identify an object, for a processor, such as described herein. Other determinations may also be made using the developed model as well, as described and referred to herein. In some embodiments, a marine electronic device and/or a submersible device may comprise one or more processors that perform the functions shown in FIG. 7.

This system may beneficially determine a depth and/or a direction of a device, and/or identify an object, by accounting for different types of marine data, as well as additional data that may come from external sources (e.g., upcoming sea floor and/or navigation information), and the developed model may assign different weights to different types of data that are provided. In some systems, even after the model is deployed, the systems may beneficially improve the developed model by analyzing further data points. By utilizing artificial intelligence, a novice user may benefit from the experience of the models utilized, making marine activities more user friendly and accessible/successful for beginners. Embodiments beneficially allow for accurate information to be provided about the watercraft, the submersible device, and/or the desired conditions or activity (e.g., rescue mission, exploration, surface mapping, etc.) and may also allow for such information to be optimized so that the user may make well-informed decisions. Utilization of the model may prevent the need for a user to spend a significant amount of time reviewing information, freeing the user to perform other tasks and enabling performance and consideration of complex estimations and computations that the user could not otherwise solve on their own (e.g., the systems described herein may also be beneficial for even the most experienced users). Further, utilization of the model may enable a novice user who would otherwise not know how to operate a submersible device to use the submersible device for sophisticated purposes such as locating a body on a floor of a body of water (among other purposes).

By receiving several different types of data, the example method 200 may be performed to generate complex models. The example method 200 may find relationships between different types of data that may not have been anticipated. By detecting relationships between different types of data, the method 200 may generate accurate models even where a limited amount of data is available.

In some embodiments, the model may be continuously improved even after the model has been deployed. Thus, the model may be continuously refined based on changes in the systems or in the environment over time, which provides a benefit as compared with other models that stay the same after being deployed. The example method 200 may also refine the deployed model to fine-tune weights that are provided to various types of data based on subtle changes in the watercraft and/or the environment. Where certain parts of the watercraft are replaced, modified, or damaged or where there are swift changes in the environment, the method 200 may continuously refine a deployed model to quickly account for the changes and provide a revised model that is accurate. By contrast, where a model is not continuously refined, changes to the watercraft or the surrounding environment may make the model inaccurate until a new model may be developed and implemented, and implementation of a new model may be very costly, time-consuming, and less accurate than a continuously refined model.

At operation 202, one or more data points are received. These data points preferably comprise known data from, e.g., preferred sea floor data, a preferred depth or depth range, a preferred range of image characteristics, or some other indication that the model may be used to predict. For example, where the model is being generated to determine an optimal depth for a submersible device, the data points provided at operation 202 preferably comprises known data that corresponds to a sea floor topography. The data points may take the form of discrete data points. However, where the data points are not known at a high confidence level, a calculated data value may be provided, and, in some cases, a standard deviation or uncertainty value may also be provided to assist in determining the weight to be provided to the data value in generating a model. In this regard, the model predicted optimal depth value may be formed based on historical comparisons of data.

For example, the model may be formed based on historical comparisons of various forms of sea floor information with historical data, and a processor may be configured to utilize the developed model to determine an estimated optimal depth recommendation based on determined flexibilities, criticalities, and other assessments of the various types of condition parameters. This model may be developed through machine learning utilizing artificial intelligence based on the historical comparisons of the historical data associated with each of the depths being considered, among other information from external data sources. Alternatively, a model may be developed through artificial intelligence, and the model may be formed based on historical comparisons of the data and additional data. A processor may be configured to use the model and input the data into the model to determine the optimal depth recommendation.

Another example of appropriate historical comparisons may include comparing additional data (e.g., geographical data from maps or nautical charts, temperature data, time data, etc.) with sea floor data. Additional data may be provided from a variety of sources, and additional data may, for example, be provided from a camera, a radar, a thermometer, a clock, a pressure sensor, a direction sensor, or a position sensor.

At operation 204, a model is improved by minimizing error between a predicted output generated by the model and an actual output for data points. In some embodiments, an initial model may be provided or selected by a user. The user may provide a hypothesis for an initial model, and the method 200 may improve the initial model. However, in other embodiments, the user may not provide an initial model, and the method 200 may develop the initial model at operation 204, such as during the first iteration of the method 200. The process of minimizing error may be similar to a linear regression analysis on a larger scale where three or more different variables are being analyzed, and various weights may be provided for the variables to develop a model with the highest accuracy possible. Where a certain variable has a high correlation with the actual output, that variable may be given increased weight in the model. For example, where data from maps or nautical charts are available, that data may be provided alongside with user input, and the model may be optimized to give the map data its appropriate weight. In refining the model by minimizing the error between the predicted output generated by the model and the actual or known output, the component performing the method 200 may perform a very large number of complex computations. Sufficient refinement results in an accurate model.

In some embodiments, the accuracy of the model may be checked. For example, at operation 206, the accuracy of the model is determined. This may be done by calculating the error between the model predicted output generated by the model and the actual output from the data points. In some embodiments, error may also be calculated before operation 204. By calculating the accuracy or the error, the method 200 may determine if the model needs to be refined further or if the model is ready to be deployed. Where the output is a qualitative value or a categorical value, the accuracy may be assessed based on the number of times the predicted value was correct. Where the output is a quantitative value, the accuracy may be assessed based on the difference between the actual value and the predicted value.

At operation 208, a determination is made as to whether the calculated error is sufficiently low. A specific threshold value may be provided in some embodiments. For example, where an output is a depth, the threshold may be 0.1 feet, and the calculated error may be sufficiently low if the average error is less than or equal to 0.1 feet. However, other threshold values may be used, and the threshold value may be altered by the user in some embodiments. If the error rate is not sufficiently low, then the method 200 may proceed back to operation 202 so that one or more additional data points may be received. If the error rate is sufficiently low, then the method 200 proceeds to operation 210. Once the error rate is sufficiently low, the training phase for developing the model may be completed, and the implementation phase may begin where the model may be used to predict the expected output.

By completing operations 202, 204, 206, and 208, a model may be refined through machine learning utilizing artificial intelligence based on the historical comparisons of data and based on known deviations of the data for the historical comparisons. Notably, example model generation and/or refinement may be accomplished even if the order of these operations is changed, if some operations are removed, or if other operations are added.

During the implementation phase, the model may be utilized to provide an optimal depth (or an identification of an object, among other things). An example implementation of a model is illustrated from operations 210-212. In some embodiments, the model may be modified (e.g., further refined) based on the received data points, such as at operation 214.

At operation 210, further data points are received. For these further data points, the output may not be known. At operation 212, the model may be used to provide a predicted output data value for the further data points. Thus, the model may be utilized to determine the output.

At operation 214, the model may be modified based on supplementary data points, such as those received during operation 210 and/or other data points. For example, the model may be refined utilizing the data and the determined output(s), such as described herein. By providing supplementary data points, the model can continuously be improved even after the model has been deployed. The supplementary data points may be the further data points received at operation 210, or the supplementary data points may be provided to the processor from some other source. In some embodiments, the processor(s) or other component performing the method 200 may receive additional data from secondary devices and verify the further data points received at operation 210 using this additional data. By doing this, the method 200 may prevent errors in the further data points from negatively impacting the accuracy of the model.

In some embodiments, supplementary data points are provided to the processor from some other source and are utilized to improve the model. For example, supplementary data points may be saved to a memory 312 (FIG. 8) associated with at least one processor 304 via communication interface 314, or the supplementary data points may be sent through the external network 306 from a remote device 316. These supplementary data points may be verified before being provided to the at least one processor 304 to improve the model, or the at least one processor 304 may verify the supplementary data points utilizing additional data.

As indicated above, in some embodiments, operation 214 is not performed and the method proceeds from operation 212 back to operation 210. In other embodiments, operation 214 occurs before operation 212 or simultaneous with operation 212. Upon completion, the method 200 may return to operation 210 and proceed on to the subsequent operations. Supplementary data points may be the further data points received at operation 210 or some other data points.

Example System Architecture

Figure 8:
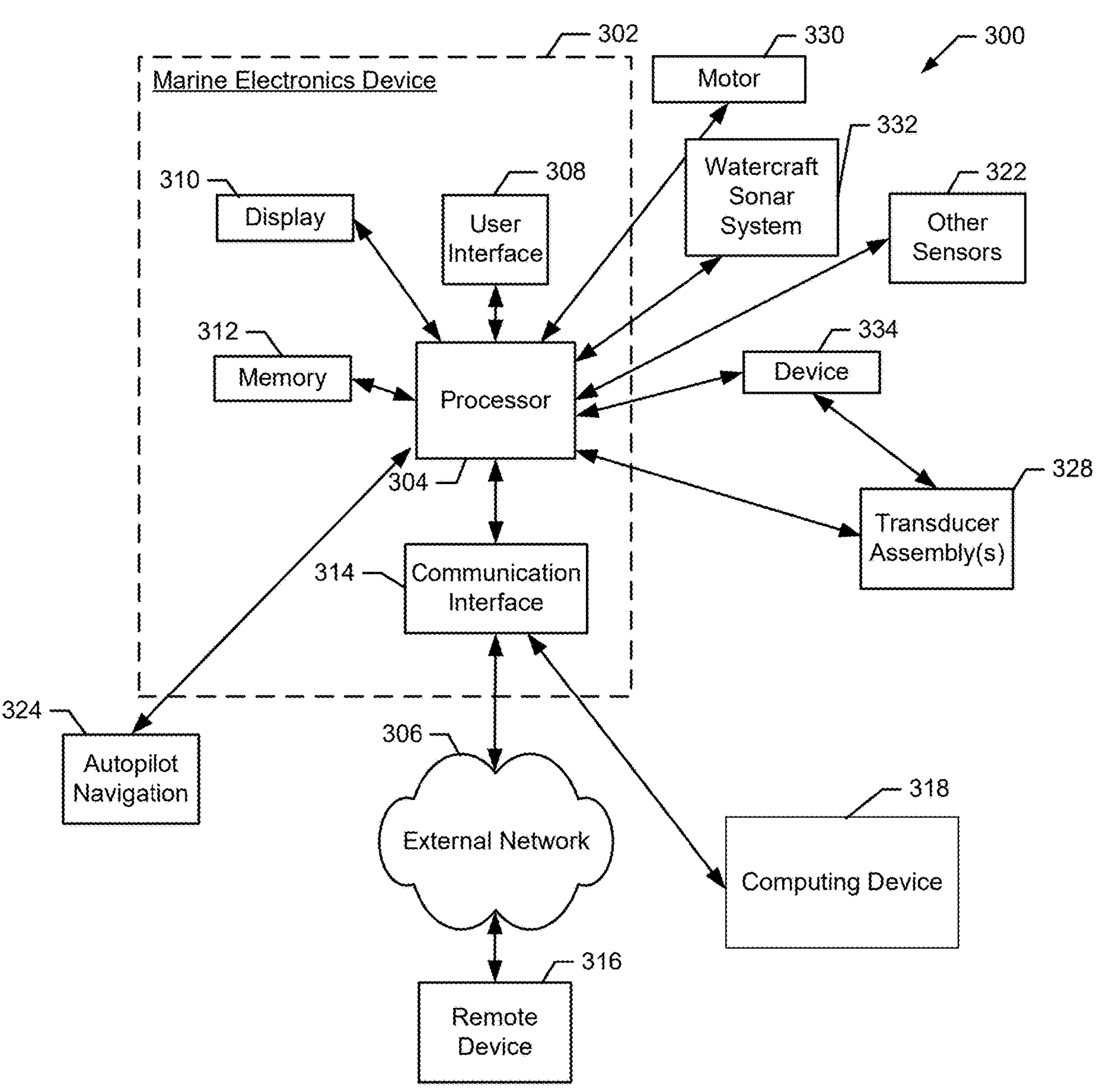
FIG. 8 is a block diagram of an example system, in accordance with some embodiments described herein.

FIG. 8 shows a block diagram of an example system 300 capable for use with several embodiments of the present disclosure. As shown, the system 300 may include a number of different modules or components, each of which may comprise any device or means embodied in either hardware, software, or a combination of hardware and software configured to perform one or more corresponding functions. For example, the system 300 may include a marine electronics device 302 (e.g., controller) and various sensors/system.

The marine electronics device 302, controller, remote control, MFD, and/or user interface display may include a processor 304, a memory 312, a communication interface 314, a user interface 308, a display 310, and one or more sensors (e.g., other sensors 322 which may be in the marine electronics device 302 or otherwise operatively connected (e.g., wired or wirelessly)). In some embodiments, the processor 304 may include an autopilot navigation assembly 324.

The processor 304 may be in communication with one or more devices such as motor 330, watercraft sonar system 332, device 334, transducer assembly(s) 328, and/or other sensors 322 to control an activity such as a search and recovery mission or a mission to create a structure map overlay (among other activities).

The watercraft sonar system 332 may include a sonar transducer assembly, which may be any type of sonar transducer (e.g., a downscan transducer, a sidescan transducer, a transducer array (e.g., for forming live sonar), among many others known to one of ordinary skill in the art). The sonar transducer assembly may be housed in the watercraft sonar system 332 and configured to gather sonar data from the underwater environment relative to the marine vessel. Accordingly, the processor 304 (such as through execution of computer program code) may be configured to adjust an orientation of the sonar transducer assembly within the watercraft sonar system 332 and receive an indication of operation of the sonar transducer assembly. The processor 304 may generate additional display data indicative of the operation of the sonar transducer and cause the display data to be displayed on the digital display. For example, a sonar icon (not shown) may be energized to indicate that the sonar transducer is operating.

The transducer assembly(s) 328 may include any type of sonar transducer (e.g., a downscan transducer, a sidescan transducer, a transducer array (e.g., for forming live sonar), among many others known to one of ordinary skill in the art). The sonar transducer assembly may be housed in and/or connected to the device 334 and configured to gather sonar data from the underwater environment relative to a position that is lower than the marine vessel. For example, the transducer assembly(s) 328 may be submersible and able to travel away from a marine vessel. The processor 304 (such as through execution of computer program code) may be configured to adjust an orientation of the transducer assembly(s) 328 and receive an indication of operation of the transducer assembly(s) 328. The processor 304 may generate additional display data indicative of the operation of the sonar transducer and cause the display data to be displayed on the digital display. For example, a sonar icon (not shown) may be energized to indicate that the sonar transducer is operating.

The device 334 may or may not be attached to transducer assembly(s) 328 (e.g., as are submersible device 114 and transducer assembly 130, which are described herein), and one or both of the device 334 and/or the transducer assembly (s) 328 may be in communication with the processor 304. The device 334 and/or the transducer assembly(s) 328 may be submersible such that sonar data can be obtained from the transducer assembly(s) 328 that is from a different perspective than sonar data obtained from the watercraft sonar system 332, as described herein. In some embodiments, the device 334 may include a propulsion and/or steering system, such as described herein. Additionally or alternatively, one or more processors or other computing circuitry may be provided within the device 334 to perform various functionality, such as described herein. In some embodiments, the watercraft sonar system 332 may be configured to interact with one or more of the motor 330, device 334, transducer assembly(s) 328, and/or the other sensors 322 via the processor 304 or directly. This may enable, for example, movement of the device 334 and/or transducer assembly(s) 328 to occur based on, e.g., data obtained from the watercraft sonar system 332, other sensors 322, etc.

The processor 304 may be positioned within the marine electronics device 302 in some embodiments, as shown in FIG. 8, but in other embodiments, the processor 304 may be positioned anywhere else. For example, the processor 304 may be positioned within the device 334, at a remote location, or within any other component shown in FIG. 8.

In some embodiments, the system 300 may be configured to receive, process, and display various types of marine data.

In some embodiments, the system 300 may include one or more processors 304 and a memory 312. Additionally, the system 300 may include one or more components that are configured to gather marine data or perform marine features. In such a regard, the processor 304 may be configured to process the marine data and generate one or more images corresponding to the marine data for display on the screen that is integrated in the marine electronics device. Further, the system 300 may be configured to communicate with various internal or external components (e.g., through the communication interface 314), such as to provide instructions related to the marine data.

The processor 304 may be any means configured to execute various programmed operations or instructions stored in a memory, such as a device and/or circuitry operating in accordance with software or otherwise embodied in hardware or a combination thereof (e.g., a processor operating under software control, a processor embodied as an application specific integrated circuit (ASIC) or field programmable gate array (FPGA) specifically configured to perform the operations described herein, or a combination thereof) thereby configuring the device or circuitry to perform the corresponding functions of the processor 304 as described herein. In this regard, the processor 304 may be configured to analyze electrical signals communicated thereto to provide, e.g., display data to the display to indicate the direction of the watercraft sonar system 332 and/or the transducer assembly(s) 328 relative to the marine vessel.

In some example embodiments, the processor 304 may be configured to receive sonar data indicative of the size, location, shape, etc. of objects detected by the transducer assembly(s) 328 and/or the watercraft sonar system 332. For example, the processor 304 may be configured to adjust a position of the transducer assembly(s) 328 and/or the watercraft sonar system 332, receive sonar return data, and process the sonar return data to generate sonar image data and/or structure map overlay data for display to a user (e.g., on display 310). In some embodiments, the processor 304 may be further configured to implement signal processing and/or enhancement features to improve the display characteristics, data, and/or images, to collect and/or process additional data (e.g., time, temperature, GPS information, waypoint designations), and/or to filter extraneous data to better analyze the collected data. In some embodiments, the processor 304 may further implement notices and/or alarms (e.g., alerts determined or adjusted by a user) to reflect depth measurements, the presence of an object, the presence of fish, the proximity of other marine vessels, status or notifications for peripheral devices/systems, etc. The processor 304 and memory 312 may form processing circuitry.

The memory 312 may be configured to store instructions, computer program code, marine data (e.g., sonar data, chart data, location/position data), and/or other data associated with the system 300 in a non-transitory computer readable medium for use by the processor, for example.

The system 300 may also include one or more communications modules configured to communicate via any of many known manners, such as via a network, for example. The processing circuitry and communication interface 314 may form a processing circuitry/communication interface. The communication interface 314 may be configured to enable connections to external systems (e.g., an external network 306 or one or more remote controls, such as a handheld remote control, marine electronics device, foot pedal, or other remote computing device). In this regard, the communication interface (e.g., 314) may include one or more of a plurality of different communication backbones or frameworks, such as Ethernet, USB, CAN, NMEA 2000, GPS, Sonar, cellular, Wi-Fi, and/or other suitable networks, for example. In this manner, the processor 304 may retrieve stored data from a remote, external server via the external network 306 in addition to or as an alternative to the onboard memory 312. The network may also support other data sources, including GPS, autopilot, engine data, compass, radar, etc. Numerous other peripheral, remote devices such as one or more wired or wireless multi-function displays may be connected to the system 300.

It should be appreciated that devices and/or systems such as the device 334, the watercraft sonar system 332, and the transducer assembly(s) 328 may, in some other embodiments, be in communication with a processor such as the processor 304 through a network such as the external network 306. That is, in some other embodiments, the device 334, the watercraft sonar system 332, and the transducer assembly(s) 328, and even other components, may be in direct communication with a network that is connected to the processor 304 rather than being in direct communication with the processor 304 itself. In some other embodiments, the device 334, the watercraft sonar system 332, and the transducer assembly(s) 328, and even other components, may be in direct communication with the processor 304 and may also be in direct communication with a network. Other configurations are also contemplated.

The processor 304 may configure the marine electronic device 302 and/or circuitry to perform the corresponding functions of the processor 304 as described herein. In this regard, the processor 304 may be configured to analyze electrical signals communicated thereto to provide, for example, various features/functions described herein.

In some embodiments, the system 300 may be configured to determine the location of the marine vessel, such as through a location sensor. The system 300 may comprise, or be associated with, a navigation system that includes the location sensor. For example, the location sensor may comprise a GPS, bottom contour, inertial navigation system, such as a micro-electro-mechanical system (MEMS) sensor, a ring laser gyroscope, or the like, or other location detection system. In such a regard, the processor 304 may be configured to act as a navigation system. For example, the processor 304 may generate at least one waypoint and, in some cases, generate an image of a chart along with the waypoint for display by the screen. Additionally or alternatively, the processor may generate one or more routes associated with the watercraft. The location of the vessel, waypoints, and/or routes may be displayed on a navigation chart on a display remote from the system 300. Further, additional navigation features (e.g., providing directions, weather information, etc.) are also contemplated.

In addition to position, navigation, and sonar data, example embodiments of the present disclosure contemplate receipt, processing, and generation of images that include other marine data. For example, the display 310 and/or user interface 308 may be configured to display images associated with vessel or motor status (e.g., gauges) or other marine data.

In any of the embodiments, the display 310 may be configured to display an indication of the current direction of the marine vessel.

The display 310 may be configured to display images and may include or otherwise be in communication with a user interface 308 configured to receive input from a user. The display 310 may be, for example, a conventional liquid crystal display (LCD), LED/OLED display, touchscreen display, mobile media device, and/or any other suitable display known in the art, upon which images may be displayed. In some embodiments, the display 310 may be the MFD and/or the user's mobile media device. The display may be integrated into the marine electronic device 302. In some example embodiments, additional displays may also be included, such as a touch screen display, mobile media device, or any other suitable display known in the art upon which images may be displayed.

In some embodiments, the display 310 may present one or more sets of marine data and/or images generated therefrom. Such marine data may include chart data, radar data, weather data, location data, position data, orientation data, sonar data, and/or any other type of information relevant to the marine vessel. In some embodiments, the display 310 may be configured to present marine data simultaneously as one or more layers and/or in split-screen mode. In some embodiments, the user may select various combinations of the marine data for display. In other embodiments, various sets of marine data may be superimposed or overlaid onto one another. For example, a route may be applied to (or overlaid onto) a chart (e.g., a map or navigation chart). Additionally, or alternatively, depth information, weather information, radar information, sonar information, and/or any other display inputs may be applied to and/or overlaid onto one another.

In some embodiments, the display 310 and/or user interface may be a screen that is configured to merely present images and not receive user input. In other embodiments, the display and/or user interface may be a user interface such that it is configured to receive user input in some form. For example, the screen may be a touchscreen that enables touch input from a user. Additionally, or alternatively, the user interface may include one or more buttons (not shown) that enable user input.

The user interface 308 may include, for example, a keyboard, keypad, function keys, mouse, scrolling device, input/output ports, touch screen, or any other mechanism by which a user may interface with the system.

In some embodiments, the system 300 may comprise an autopilot navigation 324 that is configured to operate the motor 330 to propel the marine vessel in a direction and at a speed. In some embodiments, the autopilot navigation 324 may direct the marine vessel to a waypoint (e.g., a latitude and longitude coordinate). Additionally, or alternatively, the autopilot may be configured to direct the marine vessel along a route, such as in conjunction with the navigation system. The processor 304 may generate display data based on the autopilot operating mode and cause an indication of the autopilot operating mode to be displayed on the digital display in the first portion, such as an autopilot icon. Further, the autopilot navigation 324 may be configured to provide information to the processor 304 that aids in instructions transmitted to the device 334 (e.g., to determine optimal depth data, etc.).

In some embodiments, the watercraft sonar system 332 may be used to determine depth and bottom topography, detect fish, locate wreckage, etc. Sonar beams, from a sonar transducer assembly, can be transmitted into the underwater environment. The sonar signals reflect off objects in the underwater environment (e.g., fish, structure, sea floor bottom, etc.) and return to the sonar transducer assembly, which converts the sonar returns into sonar data that can be used to produce an image of the underwater environment.

In an example embodiment, the system 300 may include a speed sensor, such as an electromagnetic speed sensor, paddle wheel speed sensor, or the like. The speed sensor may be configured to measure the speed of the marine vessel through the water. The processor 304 may receive speed data from the speed sensor and generate additional display data indicative of the speed of the marine vessel through the water. The speed data may be displayed, such as in text format on the first portion of the digital display. The speed data may be displayed in any relevant unit, such as miles per hour, kilometers per hour, feet per minute, or the like. In some instances, a unit identifier, such as a plurality of LEDs, may be provided in association with the display (may be shown in normal text or with a seven-digit display). The processor 304 may cause an LED associated with the appropriate unit for the speed data to be illuminated.

In some embodiments, the system 300 further includes one or more power sources (e.g., batteries) that are configured to provide power to the various components. In some embodiments, a power source may be rechargeable. In some example embodiments, the system 300 includes a battery sensor. The battery sensor may include a current sensor or voltage sensor configured to measure the current charge of a battery power supply of the system 300 (e.g., the power source). The battery sensor may be configured to measure individual battery cells or measure a battery bank. The processor 304 may receive battery data from the battery sensor and determine the remaining charge on the battery. In an example embodiment, the voltage or current measured by the battery sensor may be compared to a reference value or data table, stored in memory 312, to determine the remaining charge on the battery.

In some embodiments, the system 300 may include other sensors such as other sensors 322. For example, in some embodiments, the system 300 may include an accelerometer for measuring acceleration data, which may be logged by the processor. The acceleration data may be utilized, e.g., for detecting sudden unwanted movements of the watercraft (e.g., from hitting an obstacle), which could contribute, in some embodiments, to machine learning methods such as those described with respect to FIG. 7.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in general context of computer-executable instructions, such as program modules, being executed by a computer. Generally, program modules may include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some instances, program modules may be implemented on separate computing systems and/or devices adapted to communicate with one another. Further, a program module may be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network (e.g., by hard-wired links, wireless links, or combinations thereof). In a distributed computing environment, program modules may be located in both local and remote computer storage media including memory storage devices.

The system 300 may include a computing device or system 318 (e.g., mobile media device) into which implementations of various technologies and techniques described herein may be implemented. Computing device 318 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

In various implementations, each marine electronic device 302 described herein may be referred to as a marine device or as an MFD. The marine electronic device 302 may include one or more components disposed at various locations on a marine vessel. Such components may include one or more data modules, sensors, instrumentation, and/or any other devices known to those skilled in the art that may transmit various types of data to the marine electronic device 302 for processing and/or display. The various types of data transmitted to the marine electronic device 302 may include marine electronics data and/or other data types known to those skilled in the art. The marine data received from the marine electronic device 302 or system 300 may include chart data, sonar data, structure data, radar data, navigation data, position data, heading data, automatic identification system (AIS) data, Doppler data, speed data, course data, or any other type known to those skilled in the art.

In one implementation, the marine electronic device 302 may include a radar sensor for recording the radar data and/or the Doppler data, a compass heading sensor for recording the heading data, and a position sensor for recording the position data. In another implementation, the marine electronic device 302 may include a sonar transducer for recording the sonar data, an AIS transponder for recording the AIS data, a paddlewheel sensor for recording the speed data, and/or the like.

The marine electronic device 302 may receive external data via a LAN or a WAN. In some implementations, external data may relate to information not available from various marine electronics systems. The external data may be retrieved from various sources, such as, e.g., the Internet or any other source. The external data may include atmospheric temperature, atmospheric pressure, tidal data, weather, temperature, moon phase, sunrise, sunset, water levels, historic fishing data, and/or various other fishing and/or trolling related data and information.

The marine electronic device 302 may be attached to various buses and/or networks, such as a National Marine Electronics Association (NMEA) bus or network, for example. The marine electronic device 302 may send or receive data to or from another device attached to the NMEA 2000 bus. For instance, the marine electronic device 302 may transmit commands and receive data from a motor or a sensor using an NMEA 2000 bus. In some implementations, the marine electronic device 302 may be capable of steering a marine vessel and controlling the speed of the marine vessel (e.g., autopilot). For instance, one or more waypoints may be input to the marine electronic device 302, and the marine electronic device 302 may be configured to steer the marine vessel to the one or more waypoints. Further, the marine electronic device 302 may be configured to transmit and/or receive NMEA 2000 compliant messages, messages in a proprietary format that do not interfere with NMEA 2000 compliant messages or devices, and/or messages in any other format. In various other implementations, the marine electronic device 302 may be attached to various other communication buses and/or networks configured to use various other types of protocols that may be accessed via, e.g., NMEA 2000, NMEA 0183, Ethernet, Proprietary wired protocol, etc. In some implementations, the marine electronic device 302 may communicate with various other devices on the marine vessel via wireless communication channels and/or protocols.

In some implementations, the marine electronic device 302 may be connected to a global positioning system (GPS) receiver. The marine electronic device 302 and/or the GPS receiver may be connected via a network interface. In this instance, the GPS receiver may be used to determine position and coordinate data for a marine vessel on which the marine electronic device 302 is disposed. In some instances, the GPS receiver may transmit position coordinate data to the marine electronic device 302. In various other instances, any type of known positioning system may be used to determine and/or provide position coordinate data to/for the marine electronic device 302.

The marine electronic device 302 may be configured as a computing system similar to computing device 318.

Example Flowchart(s)

Embodiments of the present disclosure provide methods for creating an overlay for a structure map (e.g., a map or chart). Various examples of the operations performed in accordance with embodiments of the present disclosure will now be provided with reference to FIG. 9.

Figure 9:
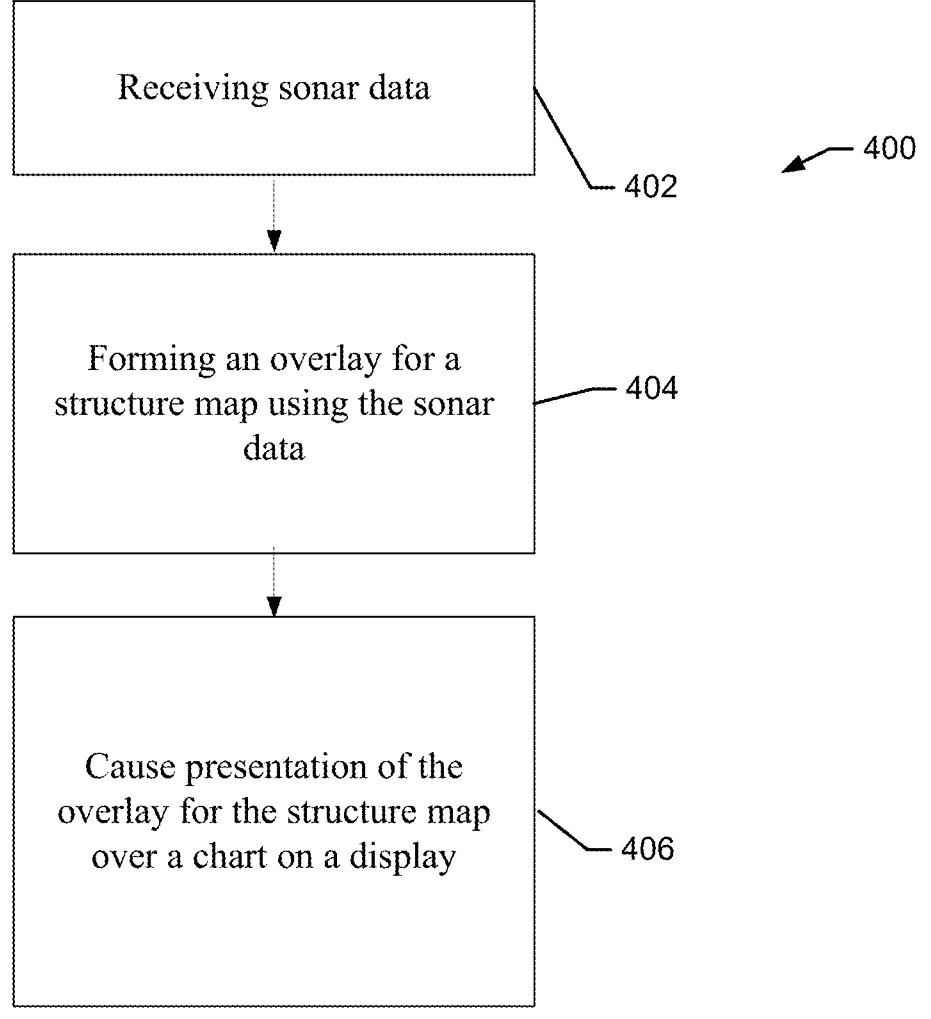
FIG. 9 shows an example method for creating an overlay for a structure map, in accordance with some embodiments discussed herein.

FIG. 9 illustrates a flowchart according to an example method 400 for creating an overlay for a structure map, according to various example embodiments described herein. The operations illustrated in and described with respect to FIG. 9 may, for example, be performed by, with the assistance of, and/or under the control of one or more of the components described herein, e.g., in relation to system 300.

Operation 402 may comprise receiving sonar data from at least one transducer assembly of a submersible device. The submersible device may be submersible to a first depth that is different than a second depth of a watercraft and/or a marine electronic device. The components discussed above with respect to system 300 may, for example, provide means for performing operation 402.

Operation 404 may include forming the overlay for the structure map using the sonar data. The overlay of the structure map may correspond to the first depth. Further, the overlay of the structure map may be different from another overlay of the structure map that is created using another transducer assembly mounted at a different depth (e.g., from a watercraft mounted transducer assembly). The components discussed above with respect to system 300 may, for example, provide means for performing operation 404.

Operation 406 may include causing presentation of the overlay for the structure map over a chart on a display of the marine electronic device. In some embodiments, for example, operation 406 may include causing presentation of the overlay in response to an indication from a user. The components discussed above with respect to system 300 may, for example, provide means for performing operation 406.

FIG. 9 illustrates flowcharts of systems, methods, and/or computer program products according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 312, and executed by, for example, the processor 304. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

In some embodiments, the methods for creating an overlay for a structure map may include additional, optional operations, and/or the operations described above may be modified or augmented.

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A towable device for a watercraft, the towable device comprising:

a first portion comprising an adaptive mount configured to receive at least one transducer assembly, wherein the adaptive mount is configured to receive at least one of at least two different types of transducer assemblies;

a second portion opposite the first portion; and a connection feature for attachment of a linking mechanism for attachment of the towable device to the watercraft, wherein the second portion is configured to encourage the towable device and the at least one transducer assembly to glide through an underwater environment, and wherein the towable device and the at least one transducer assembly are configured to glide through the underwater environment at a first depth that is different from a second depth of a hull of the watercraft via the linking mechanism, wherein the at least one transducer assembly is usable to create a selectable first structure map overlay that is different from a second structure map overlay created using a second transducer assembly that is mounted to the hull of the surface watercraft.

2. The towable device of claim 1, wherein the second portion of the towable device comprises a width and a length, and wherein the width is smaller than the length.

3. The towable device of claim 1, wherein the first portion has a first height that is at least 40 percent smaller than a second height of the second portion.

4. The towable device of claim 1, wherein the towable device and the at least one transducer assembly are independently movable with respect to the watercraft.

5. The towable device of claim 1, wherein gliding of the towable device and the at least one transducer assembly at the first depth enables an object to be identified using the at least one transducer assembly that would not otherwise be identifiable using a second transducer assembly mounted to the watercraft at the second depth.

6. The towable device of claim 1, wherein the towable device is configured to receive an underwater camera for capturing underwater video.

7. The towable device of claim 1, wherein the linking mechanism includes at least one of a chain, rope, wire, or cable, and wherein the linking mechanism is at least 20 feet long.

8. The towable device of claim 1, wherein at least one of the towable device or the linking mechanism further includes an inflatable buoy that is inflatable upon a disturbance to the linking mechanism.

9. The towable device of claim 1, wherein the at least one transducer assembly is wirelessly connected to a remote processor.

10. The towable device of claim 1, wherein the towable device further includes at least one of a propulsion system or a steering system, and wherein at least one of the towable device or the at least one transducer assembly is connected to a processor that is configured to use machine learning methods to steer the towable device and the at least one transducer assembly so as to identify and move closer to a body or other object of interest.

11. The towable device of claim 10, wherein the machine learning methods are configured to automatically adjust the first depth based on upcoming sea floor and navigation information.

12. The towable device of claim 10, wherein the machine learning methods are configured to automatically adjust the at least one of the propulsion system or the steering system based on upcoming sea floor and navigation information.

13. The towable device of claim 1, wherein at least one of the towable device or the at least one transducer assembly is connected to a processor that is configured to use machine learning methods to steer the towable device and the at least one transducer assembly so as to identify and move closer to a body or other object of interest, and wherein the processor is further configured to use the machine learning methods to identify the body or other object of interest by comparing features of the body or other object of interest to at least one of a database of information, a predetermined plurality of features, or an image.

14. The towable device of claim 1, wherein the towable device further includes at least one of a propulsion system or a steering system, and wherein at least one of the towable device or the at least one transducer assembly is connected to a processor that is configured to automatically change the first depth based on an upcoming depth of an upcoming position.

15. The towable device of claim 1, wherein a distance between the first depth and the second depth is between 10 feet and 50 feet.

16. The towable device of claim 1, wherein the towable device and the at least one transducer assembly are glidable approximately 5 feet over a floor of a body of water.

17. The towable device of claim 1, wherein the towable device includes at least one fin.

18. The towable device of claim 1, wherein the at least one transducer assembly is removably attachable to the towable device.

19. The towable device of claim 1, wherein the at least one transducer assembly is in communication with a marine electronic device.

20. A system for exploring an underwater environment, the system comprising:

a linking mechanism;

at least one transducer assembly; and a towable device comprising:

a first portion comprising an adaptive mount configured to receive the at least one transducer assembly, wherein the adaptive mount is configured to receive at least one of at least two different types of transducer assemblies;

a second portion opposite the first portion; and a connection feature for attachment of the linking mechanism for attachment of the towable device to the surface watercraft, wherein the second portion is configured to encourage the towable device and the at least one transducer assembly to glide through the underwater environment, and wherein the towable device and the at least one transducer assembly are configured to glide through the underwater environment at a first depth that is different from a second depth of a hull of the surface watercraft via the linking mechanism, wherein the at least one transducer assembly is usable to create a selectable first structure map overlay that is different from a second structure map overlay created using a second transducer assembly that is mounted to the hull of the surface watercraft.

21. An assembly comprising:

at least one transducer assembly; and a towable device comprising:

a first portion comprising an adaptive mount configured to receive the at least one transducer assembly, wherein the adaptive mount is configured to receive at least one of at least two different types of transducer assemblies;

a second portion opposite the first portion; and a connection feature for attachment of a linking mechanism for attachment of the towable device to the surface watercraft, wherein the second portion is configured to encourage the towable device and the at least one transducer assembly to glide through an underwater environment, and wherein the towable device and the at least one transducer assembly are configured to glide through the underwater environment at a first depth that is different from a second depth of a hull of the surface watercraft via the linking mechanism, wherein the at least one transducer assembly is usable to create a selectable first structure map overlay that is different from a second structure map overlay created using a second transducer assembly that is mounted to the hull of the surface watercraft.

* * * * *